United States Patent
Kato et al.

(10) Patent No.: US 7,254,101 B2
(45) Date of Patent: Aug. 7, 2007

(54) LASER BEAM POWER MODULATION PATTERN DECISION METHOD, DEVICE FOR RECORDING DATA ONTO OPTICAL RECORDING MEDIUM, AND OPTICAL RECORDING MEDIUM

(75) Inventors: Tatsuya Kato, Tokyo (JP); Hideki Hirata, Tokyo (JP); Hiroyasu Inoue, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/516,701

(22) PCT Filed: Jun. 2, 2003

(86) PCT No.: PCT/JP03/06923

§ 371 (c)(1),
(2), (4) Date: Dec. 1, 2004

(87) PCT Pub. No.: WO03/102932

PCT Pub. Date: Dec. 11, 2003

(65) Prior Publication Data

US 2005/0243676 A1 Nov. 3, 2005

(30) Foreign Application Priority Data

Jun. 3, 2002 (JP) .............................. 2002-161954

(51) Int. Cl.
*G11B 15/52* (2006.01)
(52) U.S. Cl. .................................. 369/47.53; 369/53.27
(58) Field of Classification Search ............. 369/47.53, 369/59.11

See application file for complete search history.

(56) References Cited

U.S. PATENT DOCUMENTS 5,185,733 A * 2/1993 Finkelstein et al. ...... 369/47.52

(Continued)

FOREIGN PATENT DOCUMENTS

JP 62204442 9/1987

(Continued)

*Primary Examiner*—Paul W. Huber
(74) *Attorney, Agent, or Firm*—Seed IP Law Group PLLC

(57) ABSTRACT

It is an object of the present invention to provide a method for determining a pattern for modulating the power of a laser beam which can determine a pattern for modulating the power of a laser beam so that data can be recorded in a write-once type optical recording medium with a laser beam having a low recording power at a high linear recording velocity. The method for determining a pattern for modulating the power of a laser beam according to the present invention includes the steps of determining pulse train patterns by fixing a recording power at a predetermined level and varying the level of a bottom power, modulating the power of the laser beam in accordance with the pulse train patterns to record first test signals in the optical recording medium, reproducing the first test signals, determining the optimum level of the bottom power based on the amplitude of the thus reproduced first test signals, determining pulse train patterns by fixing the bottom power at the optimum level and varying the level of the recording power, modulating the power of the laser beam in accordance with the pulse train patterns to record second test signals in the optical recording medium, reproducing the second test signals and determining the optimum level of the recording power based on at least one of jitter and error rates of the thus reproduced second test signals.

28 Claims, 11 Drawing Sheets

U.S. PATENT DOCUMENTS

| | | | | |
|---|---|---|---|---|
| 5,458,941 A | * | 10/1995 | Hintz | 428/64.4 |
| 5,648,952 A | | 7/1997 | Maegawa et al. | 369/116 |
| 5,818,808 A | * | 10/1998 | Takada et al. | 369/116 |
| 6,187,406 B1 | * | 2/2001 | Ichihara et al. | 428/64.1 |
| 6,221,455 B1 | * | 4/2001 | Yasuda et al. | 428/64.1 |
| 6,404,712 B1 | * | 6/2002 | Lee et al. | 369/47.53 |
| 6,404,713 B1 | * | 6/2002 | Ueki | 369/47.53 |
| 6,511,788 B1 | * | 1/2003 | Yasuda et al. | 430/270.13 |
| 6,611,481 B1 | * | 8/2003 | Koishi et al. | 369/47.53 |
| 6,791,926 B1 | * | 9/2004 | Furumiya et al. | 369/53.13 |
| 2003/0228539 A1 | * | 12/2003 | Hosoda et al. | 430/270.13 |

FOREIGN PATENT DOCUMENTS

| | | |
|---|---|---|
| JP | 06274922 | 9/1994 |
| JP | 08124165 | 5/1996 |
| JP | 2000-99950 | 4/2000 |
| JP | 2000187842 | 7/2000 |

* cited by examiner (a)

(b)

(a)

(b)

LASER BEAM POWER MODULATION PATTERN DECISION METHOD, DEVICE FOR RECORDING DATA ONTO OPTICAL RECORDING MEDIUM, AND OPTICAL RECORDING MEDIUM

BACKGROUND OF THE INVENTION

1. Field of the Invention

The present invention relates to a method for determining a pattern for modulating the power of a laser beam, an apparatus for recording data in an optical recording medium and an optical recording medium, and particularly, to a method for determining a pattern for modulating the power of a laser beam which can determine a pattern for modulating the power of a laser beam so that data can be recorded in a write-once type optical recording medium with a laser beam having a low recording power at a high linear recording velocity, an apparatus for recording data in an optical recording medium which can determine a pattern for modulating the power of a laser beam so that data can be recorded in a write-once type optical recording medium with a laser beam having a low recording power at a high linear recording velocity, and a write-once type optical recording medium which can determine a pattern for modulating the power of a laser beam so that data can be recorded therein with a laser beam having a low recording power at a high linear recording velocity.

2. Description of the Related Art

Optical recording media such as the CD, DVD and the like have been widely used as recording media for recording digital data. These optical recording media can be roughly classified into optical recording media such as the CD-ROM and the DVD-ROM that do not enable writing and rewriting of data (ROM type optical recording media), optical recording media such as the CD-R and DVD-R that enable writing but not rewriting of data (write-once type optical recording media), and optical recording media such as the CD-RW and DVD-RW that enable rewriting of data (data rewritable type optical recording media).

As well known in the art, data are generally recorded in a ROM type optical recording medium using pre-pits formed in a substrate in the manufacturing process thereof, while in a data rewritable type optical recording medium a phase change material is generally used as the material of the recording layer and data are recorded utilizing changes in an optical characteristic caused by phase change of the phase change material.

On the other hand, in a write-once type optical recording medium, an organic dye such as a cyanine dye, phthalocyanine dye or azo dye is generally used as the material of the recording layer and data are recorded utilizing changes in an optical characteristic caused by chemical change of the organic dye, or chemical change and physical change of the organic dye.

Further, there is known a write-once type recording medium formed by laminating two recording layers (See Japanese Patent Application Laid Open No. 62-204442, for example) and in this optical recording medium, data are recorded therein by projecting a laser beam thereon and mixing elements contained in the two recording layers to form a region whose optical characteristic differs from those of regions therearound.

In this specification, in the case where an optical recording medium includes a recording layer containing an organic dye, a region in which an organic dye chemically changes or chemically and physically changes upon being irradiated with a laser beam is referred to as "a recording mark" and in the case where an optical recording medium includes two recording layers each containing an inorganic element as a primary component, a region in which the inorganic elements contained in the two recording layers as a primary component are mixed upon being irradiated with a laser beam is referred to as "a recording mark".

An optimum method for modulating the power of a laser beam projected onto an optical recording medium for recording data therein is generally called "a pulse train pattern" or "recording strategy".

FIG. 14 is a diagram showing a typical pulse train pattern used for recording data in a CD-R including a recording layer containing an organic dye and shows a pulse train pattern for recording 3T to 11T signals in the EFM Modulation Code.

As shown in FIG. 14, in the case where data are to be recorded in a CD-R, a recording pulse having a width corresponding to the length of a recording mark M to be formed is generally employed (See Japanese Patent Application Laid Open No. 2000-187842, for example).

More specifically, the power of a laser beam is fixed at a bottom power Pb when the laser beam is projected onto a blank region in which no recording mark M is formed and fixed at a recording power Pw when the laser beam is projected onto a region in which a recording mark M is to be formed. As a result, an organic dye contained in a recording layer is decomposed or degraded at a region in which a recording mark M is to be formed and the region is physically deformed, thereby forming a recording mark M therein. In this specification, such a pulse train pattern is called a single pulse pattern.

FIG. 15 is a diagram showing a typical pulse train pattern used for recording data in a DVD-R including a recording layer containing an organic dye and shows a pulse train pattern for recording a 7T signal in the 8/16 Modulation Code.

Since data are recorded in a DVD-R at a higher linear recording velocity than when recording data in a CD-R, unlike the case of recording data in a CD-R, it is difficult to form a recording mark having a good shape using a recording pulse having a width corresponding to the length of the recording mark M to be formed.

Therefore, data are recorded in a DVD-R using a pulse train in which, as shown in FIG. 9, the recording pulse is divided into a number of divided pulses corresponding to the length of the recording mark M to be formed.

More specifically, in the case of recording an nT signal where n is an integer equal to or larger than 3 and equal to or smaller than 11 or 14 in the 8/16 Modulation Code, (n−2) divided pulses are employed and the power of the laser beam is set to a recording power Pw at the peak of each of the divided pulses and set to a bottom power Pb at the other portions of the pulse. In this specification, the thus constituted pulse train pattern is referred to as "a basic pulse train pattern".

As shown in FIG. 9, in the basic pulse train pattern, the level of a bottom power Pb is set to be equal to a reproducing power Pr used for reproducing data or close thereto.

On the other hand, a next-generation type optical recording medium that offers improved recording density and has an extremely high data transfer rate has been recently proposed.

In such a next-generation type optical recording medium, in order to achieve an extremely high data transfer rate, it is required to record data at a higher linear recording velocity than that in a conventional optical recording medium, and since the recording power Pw necessary for forming a recording mark is generally substantially proportional to the square root of the linear recording velocity in a write-once optical recording medium, it is necessary to employ a semiconductor laser having a high output for recording data in a next-generation optical recording medium.

Further, in the next-generation type optical recording medium, the achievement of increased recording capacity and extremely high data transfer rate inevitably requires the diameter of the laser beam spot used to record and reproduce data to be reduced to a very small size.

In order to reduce the laser beam spot diameter, the numerical aperture of the objective lens for condensing the laser beam needs to be increased to 0.7 or more, for example, to about 0.85, and the wavelength of the laser beam needs to be shortened to 450 nm or less, for example, to about 400 nm.

However, the output of a semiconductor laser emitting a laser beam having a wavelength equal to or shorter than 450 nm is smaller than that of a semiconductor laser emitting a laser beam having a wavelength of 780 nm for a CD and that of a semiconductor laser emitting a laser beam having a wavelength of 650 nm for a DVD, and a semiconductor laser that emits a laser beam having a wavelength equal to or shorter than 450 nm and has a high output is expensive.

Therefore, it is difficult to record data in a next-generation type optical recording medium at a high data transfer rate using the basic pulse train pattern.

The above described problems are particularly serious in a write-once type optical recording medium which is constituted so that a recording mark is formed by projecting a laser beam thereonto and mixing elements contained in a plurality of recording layers by heat generated by the laser beam.

BRIEF SUMMARY OF THE INVENTION

It is therefore an object of the present invention to provide a method for determining a pattern for modulating the power of a laser beam which can determine a pattern for modulating the power of a laser beam so that data can be recorded in a write-once type optical recording medium with a laser beam having a low recording power at a high linear recording velocity.

It is another object of the present invention to provide a method for determining a pattern for modulating the power of a laser beam which can determine a pattern for modulating the power of a laser beam so that data can be recorded in a write-once type optical recording medium at a high linear recording velocity using an inexpensive semiconductor laser having a low output.

It is a further object of the present invention to provide a method for determining a pattern for modulating the power of a laser beam which can determine a pattern for modulating the power of a laser beam so that data can be recorded in a write-once type optical recording medium including two or more recording layers with a laser beam having a low recording power at a high linear recording velocity.

It is a further object of the present invention to provide an apparatus for recording data in an optical recording medium which can determine a pattern for modulating the power of a laser beam so that data can be recorded in a write-once type optical recording medium with a laser beam having a low recording power at a high linear recording velocity.

It is a further object of the present invention to provide an apparatus for recording data in an optical recording medium which can determine a pattern for modulating the power of a laser beam so that data can be recorded in a write-once type optical recording medium at a high linear recording velocity using an inexpensive semiconductor laser having a low output.

It is a further object of the present invention to provide an apparatus for recording data in an optical recording medium which can determine a pattern for modulating the power of a laser beam so that data can be recorded in a write-once type optical recording medium including two or more recording layers with a laser beam having a low recording power at a high linear recording velocity.

It is a further object of the present invention to provide a write-once type optical recording medium which can determine a pattern for modulating the power of a laser beam so that data can be recorded therein with a laser beam having a low recording power at a high linear recording velocity.

It is a further object of the present invention to provide a write-once type optical recording medium which can determine a pattern for modulating the power of a laser beam so that data can be recorded therein at a high linear recording velocity using an inexpensive semiconductor laser having a low output.

It is a further object of the present invention to provide a write-once type optical recording medium which include two or more recording layers and can determine a pattern for modulating the power of a laser beam so that data can be recorded therein at a high linear recording velocity using an inexpensive semiconductor laser having a low output.

The inventors of the present invention vigorously pursued a study for accomplishing the above objects and, as a result, made the discovery that in the case where the level of a bottom power in the single pulse pattern or the basic pulse train pattern was increased, thereby causing the laser beam having the bottom power to augment the heating of a recording mark by the laser beam having the recording power, it was possible to form a recording mark using a laser beam with a lower recording power and that on the other hand, in the case of setting the level of the bottom power too high, a region of a recording layer which was to form a blank region was heated by the laser beam having the bottom power and the reflectivity thereof became close to that of a recording mark, whereby the amplitude of a reproduced signal was reduced and further made the discovery that the optimum level of the bottom power and the optimum level of the recording power greatly depended upon recording conditions of data such as the linear recording velocity.

The present invention is based on these findings and the above objects of the present invention can be accomplished by a method for recording data in an optical recording medium comprising steps of projecting a laser beam whose power is modulated in accordance with a pulse train pattern including a pulse whose level is set to a level corresponding to a level of a recording power set to be higher than a reproducing power and a pulse whose level is set to a level corresponding to a level of a bottom power set to be higher than the reproducing power onto a write-once type optical recording medium to record a test signal in the optical recording medium, reproducing the test signal and determining an optimum level of the recording power and an optimum level of the bottom power based on the thus reproduced test signal.

According to the present invention, since a pulse train pattern used for modulating the power of a laser beam when data are to be actually recorded by actually projecting a laser beam whose power is modulated in accordance with a pulse train pattern including a pulse whose level is set to a level corresponding to a level of a recording power set to be higher than a reproducing power and a pulse whose level is set to a level corresponding to a level of a bottom power set to be higher than the reproducing power onto a write-once type optical recording medium to record a test signal in the optical recording medium, reproducing the test signal and determining the optimum level of the recording power and the optimum level of the bottom power based on the thus reproduced test signal, it is possible to modulate the power of the laser beam in accordance with a pulse train pattern in which the recording power and bottom power are set to the optimum levels in accordance with recording conditions of data, thereby recording data in the optical recording medium.

In a preferred aspect of the present invention, the method for recording data in an optical recording medium comprises steps of determining pulse train patterns by fixing the recording power at a predetermined level and varying the level of the bottom power, modulating the power of the laser beam in accordance with the pulse train patterns to record first test signals in the optical recording medium, reproducing the first test signals and determining the optimum level of the bottom power based on the thus reproduced first test signals.

In a further preferred aspect of the present invention, the optimum level of the bottom power is determined based on amplitudes of the reproduced first test signals.

In a further preferred aspect of the present invention, the optimum level of the bottom power is determined as a level of the bottom power when the amplitude of the reproduced first test signal becomes maximum.

In a further preferred aspect of the present invention, the method for recording data in an optical recording medium comprises steps of determining pulse train patterns by fixing the bottom power at the optimum level and varying the level of the recording power, modulating the power of the laser beam in accordance with the pulse train patterns to record second test signals in the optical recording medium, reproducing the second test signals and determining the optimum level of the recording power based on the thus reproduced second test signals.

In a further preferred aspect of the present invention, the optimum level of the recording power is determined based on at least one of jitter and error rates of the reproduced second test signals.

In another preferred aspect of the present invention, the method for recording data in an optical recording medium comprises steps of determining pulse train patterns by fixing the level of the bottom power at a level substantially equal to the level of the reproducing power and varying the level of the recording power, modulating the power of the laser beam in accordance with the pulse train patterns to record second test signals in the optical recording medium, reproducing the second test signals, tentatively determining the optimum level of the recording power based on the thus reproduced second test signals, determining pulse train patterns by fixing the recording power at the tentatively determined optimum level and varying the level of the bottom power, modulating the power of the laser beam in accordance with the pulse train patterns to record first test signals in the optical recording medium, reproducing the first test signals and determining the optimum level of the bottom power based on the thus reproduced first test signals.

In a further preferred aspect of the present invention, the optimum level of the recording power is tentatively determined based on at least one of jitter and error rates of the reproduced second test signals.

In a preferred aspect of the present invention, the optical recording medium further comprises a light transmission layer, and a first recording layer and a second recording layer formed between the substrate and the light transmission layer, and is constituted so that the at least two recording marks are formed by projecting the laser beam thereonto, thereby mixing an element contained in the first recording layer as a primary component and an element contained in the second recording layer as a primary component.

In this specification, in the case where an optical recording medium includes a recording layer containing an organic dye, a region in which the organic dye chemically changes or chemically and physically changes upon being irradiated with a laser beam is referred to as a "recording mark" and in the case where an optical recording medium includes two recording layers each containing an inorganic element as a primary component, a region in which the inorganic elements contained in the two recording layers as a primary component are mixed upon being irradiated with a laser beam is referred to as a "recording mark".

The above objects of the present invention can be also accomplished by an apparatus for recording data in an optical recording medium comprising laser beam power modulation pattern determining means for projecting a laser beam whose power is modulated in accordance with a pulse train pattern including a pulse whose level is set to a level corresponding to a level of a recording power set to be higher than a reproducing power and a pulse whose level is set to a level corresponding to a level of a bottom power set to be higher than the reproducing power onto a write-once type optical recording medium to record a test signal in the optical recording medium, reproducing the test signal and determining an optimum level of the recording power and an optimum level of the bottom power based on the thus reproduced test signal.

According to the present invention, since the apparatus for recording data in an optical recording medium comprises laser beam power modulation pattern determining means for actually projecting a laser beam whose power is modulated in accordance with a pulse train pattern including a pulse whose level is set to a level corresponding to a level of a recording power set to be higher than a reproducing power and a pulse whose level is set to a level corresponding to a level of a bottom power set to be higher than the reproducing power onto a write-once type optical recording medium to record a test signal in the optical recording medium, reproducing the test signal and determining an optimum level of the recording power and an optimum level of the bottom power based on the thus reproduced test signal, data can be recorded in the write-once type optical recording medium by setting the bottom power and recording power to optimum levels in accordance with recording conditions of data and it is therefore possible to record data in the optical recording medium at a high linear recording velocity using a laser beam with low recording power.

In a preferred aspect of the present invention, the laser beam power modulation pattern determining means is constituted so as to determine pulse train patterns by fixing the recording power at a predetermined level and varying the level of the bottom power, modulate the power of the laser beam in accordance with the pulse train patterns to record first test signals in the optical recording medium, reproduce the first test signals and determine the optimum level of the bottom power based on the thus reproduced first test signals.

In a further preferred aspect of the present invention, the laser beam power modulation pattern determining means is constituted so as to determine the optimum level of the bottom power based on amplitudes of the reproduced first test signals.

In a further preferred aspect of the present invention, the laser beam power modulation pattern determining means is constituted so as to determine the optimum level of the bottom power as a level of the bottom power when the amplitude of the reproduced first test signal becomes maximum.

In a further preferred aspect of the present invention, the laser beam power modulation pattern determining means is further constituted so as to determine pulse train patterns by fixing the bottom power at the optimum level and varying the level of the recording power, modulate the power of the laser beam in accordance with the pulse train patterns to record second test signals in the optical recording medium, reproduce the second test signals and determine the optimum level of the recording power based on the thus reproduced second test signals.

In a further preferred aspect of the present invention, the laser beam power modulation pattern determining means is constituted so as to determine the optimum level of the recording power based on at least one of jitter and error rates of the reproduced second test signals.

In a further preferred aspect of the present invention, the laser beam power modulation pattern determining means is constituted so as to determine pulse train patterns by fixing the level of the bottom power at a level substantially equal to the level of the reproducing power and varying the level of the recording power, modulate the power of the laser beam in accordance with the pulse train patterns to record second test signals in the optical recording medium, reproduce the second test signals, tentatively determine the optimum level of the recording power based on the thus reproduced second test signals, determine pulse train patterns by fixing the recording power at the tentatively determined optimum level and varying the level of the bottom power, modulate the power of the laser beam in accordance with the pulse train patterns to record first test signals in the optical recording medium, reproduce the first test signals and determine the optimum level of the bottom power based on the thus reproduced first test signals.

In a further preferred aspect of the present invention, the laser beam power modulation pattern determining means is constituted so as to tentatively determine the optimum level of the recording power based on at least one of jitter and error rates of the reproduced second test signals.

In a further preferred aspect of the present invention, data are recorded in the optical recording medium by projecting a laser beam having a wavelength equal to or shorter than 450 nm thereonto.

In a further preferred aspect of the present invention, data are recorded in the optical recording medium by employing an objective lens and a laser beam whose numerical aperture NA and wavelength λ satisfy λ/NA≦640 nm, and projecting the laser beam onto the optical recording medium via the objective lens.

The above objects of the present invention can be also accomplished by a write-once type optical recording medium comprising a substrate and at least one recording layer disposed on the substrate and being constituted so that data are recorded by projecting a laser beam whose power is modulated in accordance with a pulse train pattern including at least pulses whose levels are set to levels corresponding to a recording power and a first bottom power onto the at least one recording layer to form a recording mark in the at least one recording layer, the optical recording medium being recorded with modulation pattern setting data for setting a pulse train pattern used for modulating a power of the laser beam, which modulation pattern setting data are produced by determining pulse train patterns by fixing the recording power at a predetermined level and varying the level of the bottom power, modulating the power of the laser beam in accordance with the pulse train patterns to record first test signals in the optical recording medium, reproducing the first test signals and determining the optimum level of the bottom power based on the thus reproduced first test signals, determining pulse train patterns by fixing the bottom power at the optimum level and varying the level of the recording power, modulating the power of the laser beam in accordance with the pulse train patterns to record second test signals in the optical recording medium, reproducing the second test signals and determining the optimum level of the recording power based on the thus reproduced second test signals.

According to the present invention, since the optical recording medium is recorded with modulation pattern setting data produced by determining pulse train patterns by fixing the recording power at a predetermined level and varying the level of the bottom power, modulating the power of the laser beam in accordance with the pulse train patterns to record first test signals in the optical recording medium, reproducing the first test signals and determining the optimum level of the bottom power based on the thus reproduced first test signals, determining pulse train patterns by fixing the bottom power at the optimum level and varying the level of the recording power, modulating the power of the laser beam in accordance with the pulse train patterns to record second test signals in the optical recording medium, reproducing the second test signals and determining the optimum level of the recording power based on the thus reproduced second test signals, data can be recorded in the optical recording medium by reading the modulation pattern setting data recorded therein prior to recording data therein and setting the bottom power and recording power to optimum levels in accordance with recording conditions of data and it is therefore possible to record data in the optical recording medium at a high linear recording velocity using a laser beam with low recording power.

In a preferred aspect of the present invention, the optical recording medium further comprises a light transmission layer, and a first recording layer and a second recording layer formed between the substrate and the light transmission layer, and is constituted so that the at least two recording marks are formed by projecting the laser beam thereonto, thereby mixing an element contained in the first recording layer as a primary component and an element contained in the second recording layer as a primary component.

In a preferred aspect of the present invention, the modulation pattern setting data are produced by determining the optimum level of the bottom power based on amplitudes of the reproduced first test signals.

In a further preferred aspect of the present invention, the modulation pattern setting data are produced by determining the optimum level of the recording power based on at least one of jitter and error rates of the reproduced second test signals.

In a further preferred aspect of the present invention, the modulation pattern setting data are produced by determining pulse train patterns by fixing the level of the bottom power at a level substantially equal to the level of the reproducing power and varying the level of the recording power, modulating the power of the laser beam in accordance with the pulse train patterns to record second test signals in the optical recording medium, reproducing the second test signals, tentatively determining the optimum level of the recording power based on the thus reproduced second test signals, determining pulse train patterns by fixing the recording power at the tentatively determined optimum level and varying the level of the bottom power, modulating the power of the laser beam in accordance with the pulse train patterns to record first test signals in the optical recording medium, reproducing the first test signals and determining the optimum level of the bottom power based on the thus reproduced first test signals.

In a further preferred aspect of the present invention, the modulation pattern setting data are produced by tentatively determining the optimum level of the recording power based on at least one of jitter and error rates of the reproduced second test signals.

In a further preferred aspect of the present invention, the second recording layer is formed so as to be in contact with the first recording layer.

In the present invention, it is preferable for the first recording layer and the second recording layer to contain different elements as a primary component and for each of them to contain an element selected from a group consisting of Al, Si, Ge, C, Sn, Au, Zn, Cu, B, Mg, Ti, Mn, Fe, Ga, Zr, Ag and Pt as a primary component.

In a preferred aspect of the present invention, the first recording layer contains an element selected from a group consisting of Si, Ge, Sn, Mg, In, Zn, Bi and Al as a primary component, and the second recording layer contains Cu as a primary component.

In the present invention, in the case where the first recording layer contains an element selected from a group consisting of Si, Ge, Sn, Mg, In, Zn, Bi and Al as a primary component, and the second recording layer contains Cu as a primary component, the optical recording medium may include one or more recording layers containing an element selected from the group consisting of Si, Ge, Sn, Mg, In, Zn, Bi and Al as a primary component or one or more recording layers containing Cu as a primary element, in addition to the first recording layer and the second recording layer.

In the present invention, it is more preferable for the first recording layer to contain an element selected from a group consisting of Ge, Si, Mg, Al and Sn as a primary component.

In the present invention, in the case where the first recording layer contains an element selected from a group consisting of Si, Ge, Sn, Mg, In, Zn, Bi and Al as a primary component, and the second recording layer contains Cu as a primary component, it is preferable that at least one kind of an element selected from the group consisting of Al, Si, Zn, Mg, Au, Sn, Ge, Ag, P, Cr, Fe and Ti is added to the second recording layer and it is more preferable that at least one kind of an element selected from the group consisting of Al, Zn, Sn and Au is added to the second recording layer.

In another preferred aspect of the present invention, the first recording layer contains an element selected from a group consisting of Si, Ge, C, Sn, Zn and Cu as a primary component and the second recording layer contains Al as a primary component.

In the present invention in the case where the first recording layer contains an element selected from a group consisting of Si, Ge, C, Sn, Zn and Cu as a primary component and the second recording layer contains Al as a primary component, the optical recording medium may include one or more recording layer containing an element selected from the group consisting of Si, Ge, C, Sn, Zn and Cu as a primary component or one or more recording layer containing Al as a primary component, in addition to the first recording layer and the second recording layer.

In the present invention in the case where the first recording layer contains an element selected from a group consisting of Si, Ge, C, Sn, Zn and Cu as a primary component and the second recording layer contains Al as a primary component, it is preferable that at least one kind of an element selected from the group consisting of Mg, Au, Ti and Cu is added to the second recording layer.

In the present invention in the case where the first recording layer contains an element selected from a group consisting of Si, Ge, C, Sn, Zn and Cu as a primary component and the second recording layer contains Al as a primary component, the first recording layer and the second recording layer are preferably formed so that the total thickness thereof is 2 nm to 40 nm, more preferably, 2 nm to 30 nm, most preferably, 2 nm to 20 nm.

In a further preferred aspect of the present invention, the first recording layer contains an element selected from a group consisting of Si, Ge, C and Al as a primary component, the second recording layer contains Zn as a primary component and the first recording layer and the second recording layer are formed so that the total thickness thereof is equal to or thinner than 30 nm.

In the present invention, in the case where the first recording layer contains an element selected from a group consisting of Si, Ge, C and Al as a primary component and the second recording layer contains Zn as a primary component, the optical recording medium may include one or more recording layer containing an element selected from the group consisting of Si, Ge, C and Al as a primary component or one or more recording layer containing Zn as a primary component.

In the present invention, in the case where the first recording layer contains an element selected from a group consisting of Si, Ge, C and Al as a primary component and the second recording layer contains Zn as a primary component, it is preferable for the first recording layer to contain an element selected from a group consisting of Si, Ge and C as a primary component.

In the present invention, in the case where the first recording layer contains an element selected from a group consisting of Si, Ge, C and Al as a primary component and the second recording layer contains Zn as a primary component, the first recording layer and the second recording layer are preferably formed so that the total thickness thereof is 2 nm to 30 nm, more preferably, 2 nm to 24 nm, most preferably, 2 nm to 12 nm.

In the present invention, in the case where the first recording layer contains an element selected from a group consisting of Si, Ge, C and Al as a primary component and the second recording layer contains Zn as a primary component, it is preferable that at least one kind of an element selected from the group consisting of Mg, Cu and Al I added to the second recording layer.

In a preferred aspect of the present invention, the light transmission layer is formed so as to have a thickness of 10 nm to 300 nm.

The above and other objects and features of the present invention will become apparent from the following description made with reference to the accompanying drawings.

BRIEF DESCRIPTION OF THE SEVERAL VIEWS OF THE DRAWINGS

FIG. 3 is a set of diagrams showing a first pulse train pattern in the case of using the 1,7RLL Modulation Code, wherein FIG. 3(a) shows a first pulse train pattern used for recording a 2T signal and FIG. 3(b) shows a first pulse train pattern used for recording one of a 3T signal to an 8T signal.

FIG. 4 is a set of diagrams showing a second pulse train pattern in the case of using the 1,7RLL Modulation Code, wherein FIG. 4(a) shows a second pulse train pattern used for recording a 2T signal and FIG. 4(b) shows a second pulse train pattern used for recording one of a 3T signal to an 8T signal.

DETAILED DESCRIPTION OF THE INVENTION

Preferred embodiments of the present invention will now be described with reference to accompanying drawings.

Figure 1:
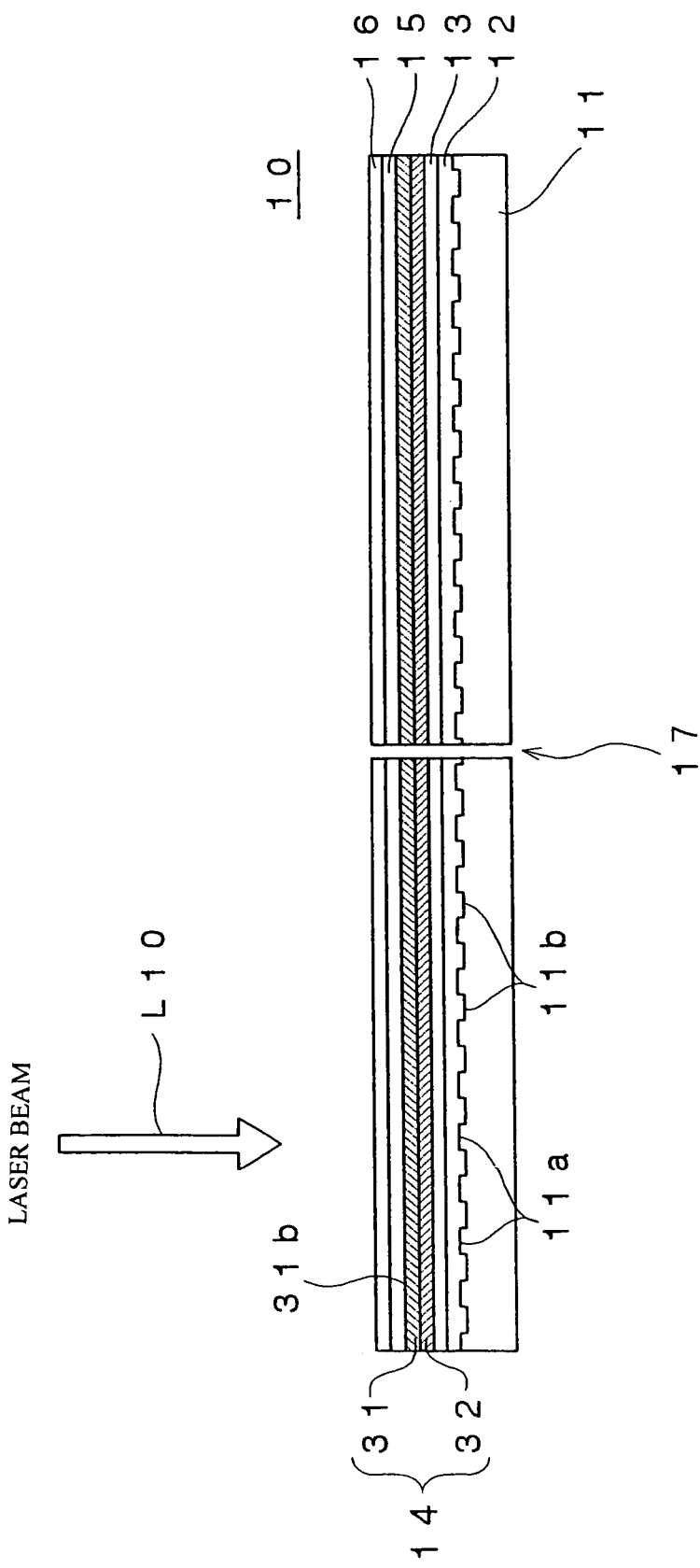
FIG. 1 is a schematic cross-sectional view showing the structure of an optical recording medium that is a preferred embodiment of the present invention.

FIG. 1 is a schematic cross-sectional view showing the structure of an optical recording medium that is a preferred embodiment of the present invention.

As shown in FIG. 1, the optical recording medium 10 according to this embodiment is constituted as a write-once type optical recording medium and includes a substrate 11, a reflective layer 12 formed on the surface of the substrate 11, a second dielectric layer 13 formed on the surface of the reflective layer 12, a second recording layer 32 formed on the surface of the second dielectric layer 13, a first recording layer 31 formed on the surface of the second recording layer 32, a first dielectric layer 15 formed on the surface of the first recording layer 31 and a light transmission layer 16 formed on the surface of the first dielectric layer 15.

As shown in FIG. 1, a center hole is formed at a center portion of the optical recording medium 10.

In this embodiment, as shown in FIG. 1, a laser beam L10 is projected onto the surface of the light transmission layer 16, thereby recording data in the optical recording medium 10 or reproducing data from the optical recording medium 10.

The substrate 11 serves as a support for ensuring mechanical strength required for the optical recording medium 10.

The material used to form the substrate 11 is not particularly limited insofar as the substrate 11 can serve as the support of the optical recording medium 10. The substrate 11 can be formed of glass, ceramic, resin or the like. Among these, resin is preferably used for forming the substrate 11 since resin can be easily shaped. Illustrative examples of resins suitable for forming the substrate 40 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin is most preferably used for forming the substrate 11 from the viewpoint of easy processing, optical characteristics and the like.

In this embodiment, the substrate 11 has a thickness of about 1.1 mm.

The shape of the substrate 11 is not particularly limited but is normally disk-like, card-like or sheet-like. As shown in FIG. 1, grooves 11a and lands 11b are alternately formed on the surface of the substrate 11. The grooves 11a and/or lands 11b serve as a guide track for the laser beam L10 when data are to be recorded or when data are to be reproduced.

The reflective layer 12 serves to reflect the laser beam L10 entering through the light transmission layer 16 so as to emit it from the light transmission layer 16.

The thickness of the reflective layer 12 is not particularly limited but is preferably from 10 nm to 300 nm, more preferably from 20 nm to 200 nm.

The material used to form the reflective layer 12 is not particularly limited insofar as it can reflect a laser beam, and the reflective layer 12 can be formed of Mg, Al, Ti, Cr, Fe, Co, Ni, Cu, Zn, Ge, Ag, Pt, Au and the like. Among these materials, it is preferable to form the reflective layer 12 of a metal material having a high reflectivity, such as Al, Au, Ag, Cu or alloy containing at least one of these metals, such as alloy of Al and Ti.

The reflective layer 12 is provided in order to increase the difference in reflection coefficient between a recorded region and an unrecorded region by a multiple interference effect when the laser beam L10 is used to optically reproduce data from the first recording layer 31 and the second recording layer 32, thereby obtaining a higher reproduced signal (C/N ratio).

The first dielectric layer 15 and the second dielectric layer 13 serve to protect the first recording layer 31 and the second recording layer 32. Degradation of data recorded in the first recording layer 31 and the second recording layer 32 can be prevented over a long period by the first dielectric layer 15 and the second dielectric layer 13. Further, since the second dielectric layer 13 also serves to prevent the substrate 11 and the like from being deformed by heat, it is possible to effectively prevent jitter and the like from becoming worse due to the deformation of the substrate 11 and the like.

The dielectric material used to form the first dielectric layer 15 and the second dielectric layer 13 is not particularly limited insofar as it is transparent and the first dielectric layer 15 and the second dielectric layer 13 can be formed of a dielectric material containing oxide, sulfide, nitride or a combination thereof, for example, as a primary component. More specifically, in order to prevent the substrate 11 and the like from being deformed by heat and thus protect the first recording layer 31 and the second recording layer 32, it is preferable for the first dielectric layer 15 and the second dielectric layer 13 to contain at least one kind of dielectric material selected from the group consisting of $Al_2O_3$, AlN, ZnO, ZnS, GeN, GeCrN, CeO, SiO, $SiO_2$, SiN and SiC as a primary component and it is more preferable for the first dielectric layer 15 and the second dielectric layer 13 to contain $ZnS.SiO_2$ as a primary component.

The first dielectric layer 15 and the second dielectric layer 13 may be formed of the same dielectric material or of different dielectric materials. Moreover, at least one of the first dielectric layer 15 and the second dielectric layer 13 may have a multi-layered structure including a plurality of dielectric films.

In this specification, the statement that a dielectric layer contains a certain dielectric material as a primary component means that the dielectric material is maximum among dielectric materials contained in the dielectric layer. ZnS-$.SiO_2$ means a mixture of ZnS and $SiO_2$.

The thickness of the first dielectric layer 15 and the second dielectric layer 13 is not particularly limited but is preferably from 3 nm to 200 nm. If the first dielectric layer 15 or the second dielectric layer 13 is thinner than 3 nm, it is difficult to obtain the above-described advantages. On the other hand, if the first dielectric layer 15 or the second dielectric layer 13 is thicker than 200 nm, it takes a long time to form the first dielectric layers 15 and the second dielectric layers 13, thereby lowering the productivity of the optical recording medium 10, and cracks may be generated in the optical recording medium 10 owing to stress present in the first dielectric layers 15 and/or the second dielectric layer 13.

The first recording layer 31 and the second recording layer 32 are adapted for recording data therein. In this embodiment, the first recording layer 31 is disposed on the side of the light transmission layer 16 and the second recording layer 32 is disposed on the side of the substrate 11.

In this embodiment, the first recording layer 31 contains an element selected from the group consisting of Si, Ge, Sn, Mg, In, Zn, Bi and Al as a primary component and the second recording layer 32 contains Cu as a primary component.

It is possible to improve the long term storage reliability of an optical recording medium 10 by proving the first recording layer 31 containing an element selected from the group consisting of Si, Ge, Sn, Mg, In, Zn, Bi and Al as a primary component and the second recording layer 32 containing Cu as a primary component in this manner.

Further, these elements apply only light load to the environment and there is no risk of the global atmosphere being damaged.

In order to thoroughly improve the C/N ratio of the reproduced signal, it is particularly preferable for the first recording layer 31 to contain an element selected from the group consisting of Ge, Si, Mg, Al and Sn as a primary component and is particularly preferable for the to contain Si as a primary component.

Cu contained in the second recording layer 32 as a primary component quickly mixes with the element contained in the first recording layer 31 when irradiated with a laser beam L10, thereby enabling data to be quickly recorded in the first recording layer 31 and the second recording layer 32.

In order to improve the recording sensitivity of the first recording layer 31, it is preferable for the first recording layer 31 to be added with at least one kind of an element selected from the group consisting of Mg, Al, Cu, Ag and Au.

In order to improve the storage reliability and the recording sensitivity of the second recording layer 32, it is preferable for the second recording layer 32 to be added with at least one kind of an element selected from the group consisting of Al, Si, Zn, Mg, Au, Sn, Ge, Ag, P, Cr, Fe and Ti.

The total thickness of the first recording layer 31 and the second recording layer 32 is not particularly limited but the surface smoothness of the first recording layer 31 irradiated with the laser beam L10 becomes worse as the total thickness of the first recording layer 31 and the second recording layer 32 becomes thicker. As a result, the noise level of the reproduced signal becomes higher and the recording sensitivity is lowered. On the other hand, in the case where the total thickness of the first recording layer 31 and the second recording layer 32 is too small, the change in reflection coefficient between before and after irradiation with the laser beam L10 is small, so that a reproduced signal having high strength (C/N ratio) cannot be obtained. Moreover, it becomes difficult to control the thickness of the first recording layer 31 and the second recording layer 32.

Therefore, in this embodiment, the first recording layer 31 and the second recording layer 32 are formed so that the total thickness thereof is from 2 nm to 40 nm. In order to obtain a reproduced signal having higher strength (C/N ratio) and further decrease the noise level of the reproduced signal, the total thickness of the first recording layer 31 and the second recording layer 32 is preferably from 2 nm to 20 nm and more preferably 2 nm to 10 nm.

The individual thicknesses of the first recording layer 31 and the second recording layer 32 are not particularly limited but in order to considerably improve the recording sensitivity and greatly increase the change in reflection coefficient between before and after irradiation with the laser beam L10, the thickness of the first recording layer 31 is preferably from 1 nm to 30 nm and the thickness of the second recording layer 32 is preferably from 1 nm to 30 nm. Further, it is preferable to define the ratio of the thickness of the first recording layer 31 to the thickness of the second recording layer 32 (thickness of first recording layer 31/thickness of second recording layer 32) to be from 0.2 to 5.0.

The light transmission layer 16 serves to transmit a laser beam L10 and preferably has a thickness of 10 μm to 300 μm. More preferably, the light transmission layer 16 has a thickness of 50 μm to 150 μm.

The material used to form the light transmission layer 16 is not particularly limited but in the case where the light transmission layer 16 is to be formed by the spin coating process or the like, ultraviolet ray curable acrylic resin, ultraviolet ray curable epoxy resin, electron beam curable acrylic resin, electron beam curable epoxy resin or the like is preferably used. More preferably, the light transmission layer 16 is formed of ultraviolet ray curable acrylic resin or ultraviolet ray curable epoxy resin.

The light transmission layer 16 may be formed by adhering a sheet made of light transmittable resin to the surface of the first dielectric layer 15 using an adhesive agent.

The optical recording medium 10 having the above-described configuration can, for example, be fabricated in the following manner.

The reflective layer 12 is first formed on the surface of the substrate 11 formed with the grooves 11a and lands 11b.

The reflective layer 12 can be formed by a gas phase growth process using chemical species containing elements for forming the reflective layer 12. Illustrative examples of the gas phase growth processes include vacuum deposition process, sputtering process and the like.

The second dielectric layer 13 is then formed on surface of the reflective layer 12.

The second dielectric layer 13 can be also formed by a gas phase growth process using chemical species containing elements for forming the second dielectric layer 13. Illustrative examples of the gas phase growth processes include vacuum deposition process, sputtering process and the like.

The second recording layer 32 is further formed on the second dielectric layer 13. The second recording layer 32 can be also formed by a gas phase growth process using chemical species containing elements for forming the second recording layer 32.

The first recording layer 31 is then formed on the second recording layer 32. The first recording layer 31 can be also formed by a gas phase growth process using chemical species containing elements for forming the first recording layer 31.

The first dielectric layer 15 is then formed on the first recording layer 31. The first dielectric layer 15 can be also formed by a gas phase growth process using chemical species containing elements for forming the first dielectric layer 15.

Finally, the light transmission layer 16 is formed on the first dielectric layer 15. The light transmission layer 16 can be formed, for example, by applying an acrylic ultraviolet ray curable resin or epoxy ultraviolet ray curable resin adjusted to an appropriate viscosity onto the surface of the second dielectric layer 15 by spin coating to form a coating layer and irradiating the coating layer with ultraviolet rays to cure the coating layer.

Thus, the optical recording medium 10 was fabricated.

Data are recorded in the optical recording medium 10 of the above-described configuration, in the following manner, for example.

Figure 2:
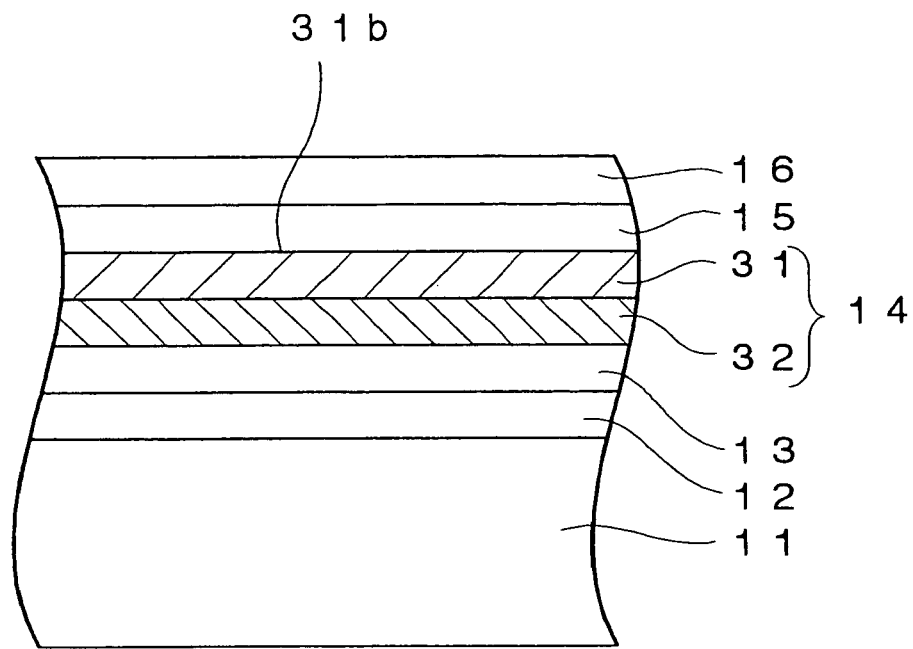
FIG. 2(a) is a schematic enlarged cross-sectional view of the optical recording medium shown in FIG. 1
FIG. 2(b) is a schematic enlarged cross-sectional view showing an optical recording medium after data have been recorded therein.
Figure 2:
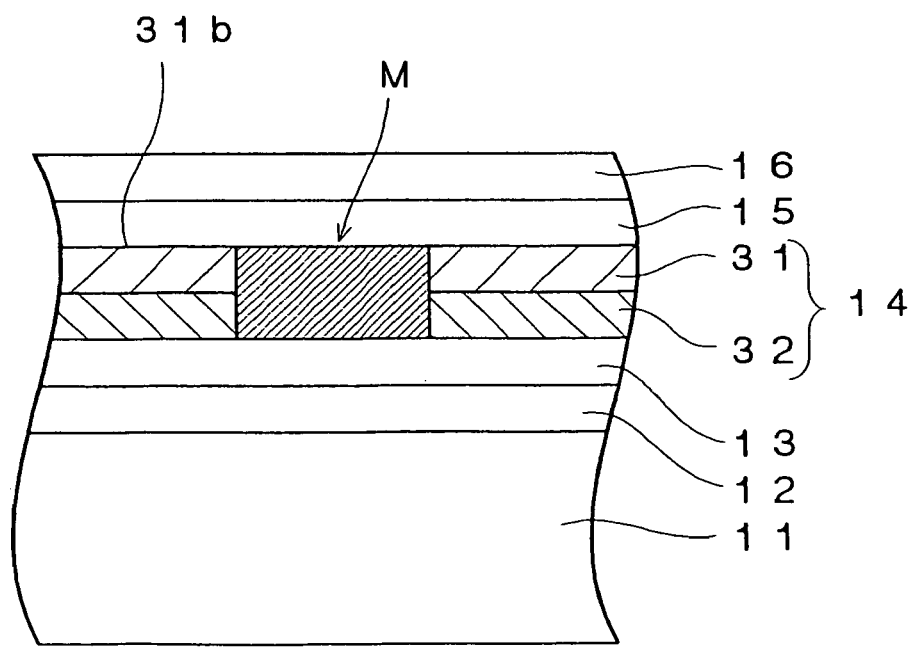

As shown in FIGS. 1 and 2(a), the first recording layer 31 and the second recording layer 32 are first irradiated via the light transmission layer 16 with a laser beam L10 having predetermined power.

In order to record data with high recording density, it is preferable to project a laser beam L10 having a wavelength $\lambda$ of 450 nm or shorter onto the optical recording medium 10 via an objective lens (not shown) having a numerical aperture NA of 0.7 or more and it is more preferable that $\lambda$/NA be equal to or smaller than 640 nm. In such a case, the spot diameter of the laser beam L10 on the surface of the first recording layer 31 becomes equal to or smaller than 0.65 µm.

In this embodiment, a laser beam L10 having a wavelength $\lambda$ of 405 nm is condensed onto the optical recording medium 10 via an objective lens having a numerical aperture NA of 0.85 so that the spot diameter of the laser beam L10 on the surface of the first recording layer 31 becomes about 0.43 µm.

As a result, the element contained in the first recording layer 31 as a primary component and the element contained in the second recording layer 32 as a primary component mix with each other and as shown in FIG. 2(b), a recording mark M composed of a mixture of the primary component element of the first recording layer 31 and the primary component element of the second recording layer 32 is formed.

When the primary component elements of the first recording layers 31 and 32 are mixed, the reflection coefficient of the region markedly changes. Since the reflection coefficient of the thus formed recording mark M is therefore greatly different from that of the region surrounding the mixed region M, it is possible to obtain a high reproduced signal (C/N ratio) when optically recorded information is reproduced.

When the laser beam L10 is projected, the first recording layer 31 and the second recording layer 32 are heated by the laser beam L10. In this embodiment, however, the first dielectric layer 15 and the second dielectric layer 13 are disposed outward of the first recording layer 31 and the second recording layer 32. Deformation of the substrate 11 and the light transmission layer 16 by heat is therefore effectively prevented.

Figure 3:
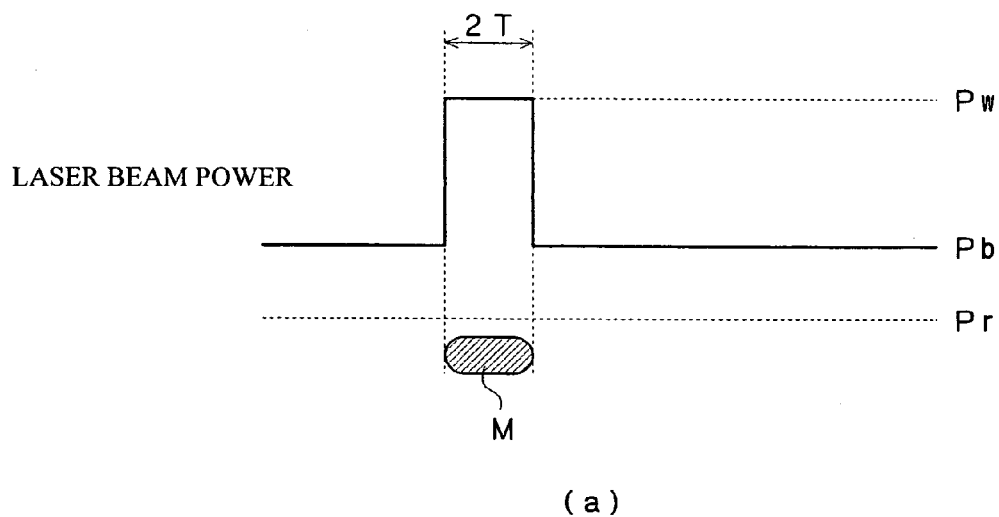
Figure 3:
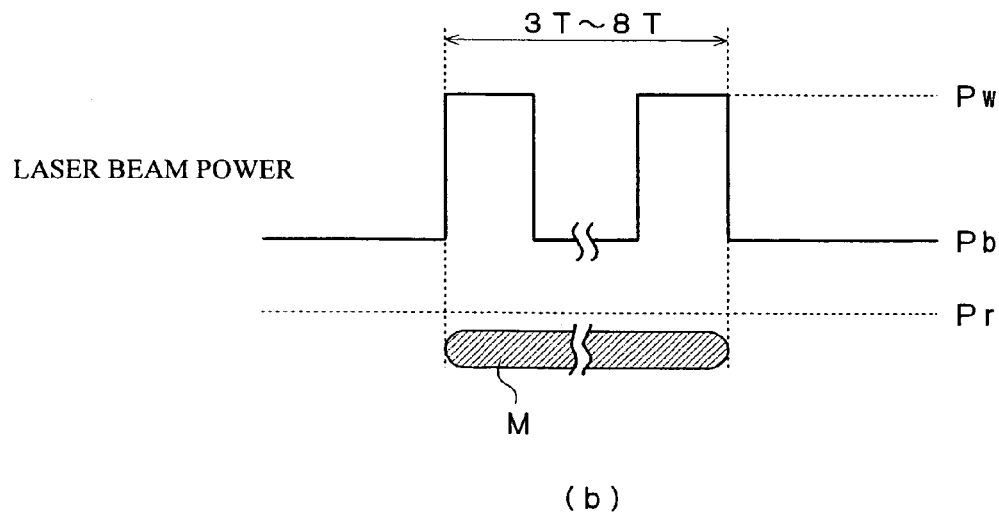

FIG. 3 is a set of diagrams showing a first pulse train pattern in the case of using the 1,7RLL Modulation Code, wherein FIG. 3(a) shows a first pulse train pattern used for recording a 2T signal and FIG. 3(b) shows a first pulse train pattern used for recording one of a 3T signal to an 8T signal.

The first pulse train pattern is a pattern for modulating the power of a laser beam L10 suitable for the case of forming a recording mark M using a lower recording power Pw and is preferably employed in the case of increasing the linear recording velocity and recording data at a high data transfer rate.

As shown in FIGS. 3(a) and 3(b), in the first pulse train pattern, a recording pulse for forming a recording mark M is divided into (n−1) divided pulses and the power of a laser beam L10 is set to a recording power Pw at the peak of each of the divided pulses and set to a bottom power Pb higher than a reproducing power Pr of a laser beam L10 used for reproducing data at other portions of the pulse. More specifically, the first pulse train pattern is constituted by increasing the bottom power Pb in the basic pulse train pattern shown in FIG. 10 from a level substantially equal to the reproducing power Pr to the first bottom power Pb higher than the reproducing power Pr.

The recording power Pw is set to a high level such that the element contained in the first recording layer 31 as a primary component and the element contained in the second recording layer 32 as a primary component can be heated and mixed to form a record mark M when a laser beam having the recording power Pw is projected onto the optical recording medium 10. On the other hand, the first bottom power Pb is set to a low level such that it is higher than the reproducing power Pr but the element contained in the first recording layer 31 as a primary component and the element contained in the second recording layer 32 as a primary component cannot substantially be mixed when a laser beam having the first bottom power Pb is projected onto the optical recording medium 10.

As the level of the bottom power Pb becomes higher, since the heating of the first recording layer 31 and the second recording layer 32 by a laser beam whose power is set to the recording power Pw is augmented by a laser beam whose power is set to the bottom power Pb, it is possible to form a recording mark M and record data using a laser beam L10 having a low recording power Pw. On the other hand, in the case where the level of the bottom power Pb is too high, there arises a risk of the laser beam whose power is set to the bottom power Pb causing the element contained in the first recording layer 31 as a primary component and the element contained in the second recording layer 32 as a primary component to mix with each other at a blank region where no recording mark M is to be formed.

Therefore, it is preferable to set the level of the bottom power Pb of the laser beam as high as possible insofar as a reproduced signal having a sufficient amplitude can be obtained.

In the case where the first pulse train pattern is constituted in this manner, the heating of a region where a recording mark M is to be formed by a laser beam whose power is set to the recording power Pw is augmented by a laser beam whose power is set to the bottom power Pb, thereby facilitating the formation of a recording mark M. On the other hand, it is possible to prevent the laser beam whose power is set to the bottom power Pb from causing the element contained in the first recording layer 31 as a primary component and the element contained in the second recording layer 32 as a primary component from mixing with each other at a blank region between neighboring recording marks M, thereby forming a recording mark M at the blank region.

Therefore, in the case where the power of a laser beam L10 is modulated using the first pulse train pattern, thereby recording data in the optical recording medium 10, a recording mark M can be formed using a laser beam L10 having a lower recording power Pw at a high linear recording velocity.

Figure 4:
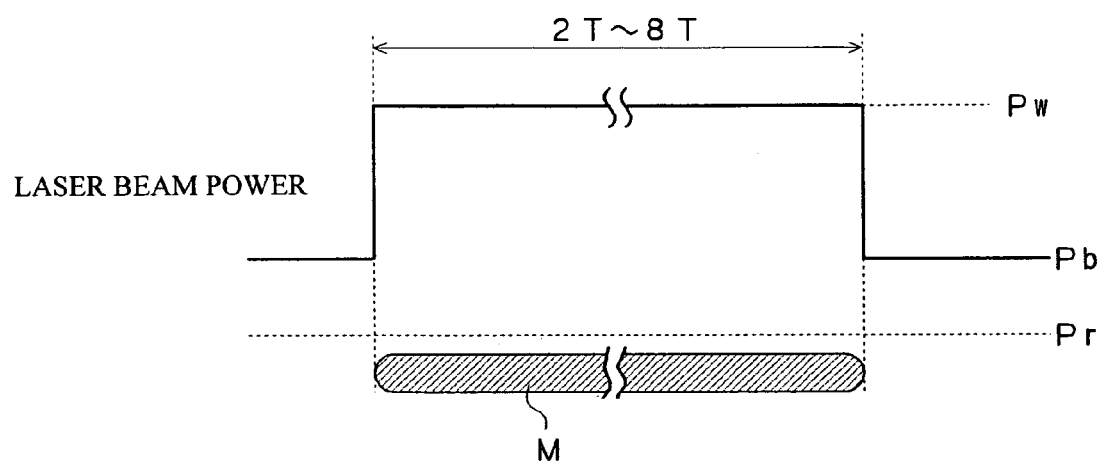

FIG. 4 is a set of a diagram showing a second pulse train pattern in the case where the 1.7RLL Modulation Code is employed.

The second pulse train pattern is a pattern for modulating a laser beam L10 which is suitable for the case where the time required for the passage of a laser beam through the shortest blank region is very short, in other words, where the ratio of the length of the shortest blank region to the linear recording velocity is small.

Figure 14:
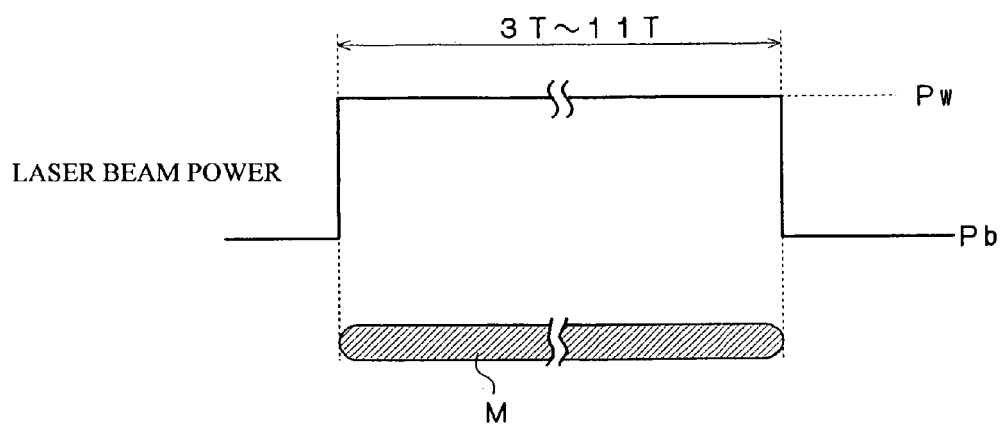
FIG. 14 is a diagram showing a typical pulse train pattern used for recording data in a CD-R including a recording layer containing an organic dye.
Figure 15:
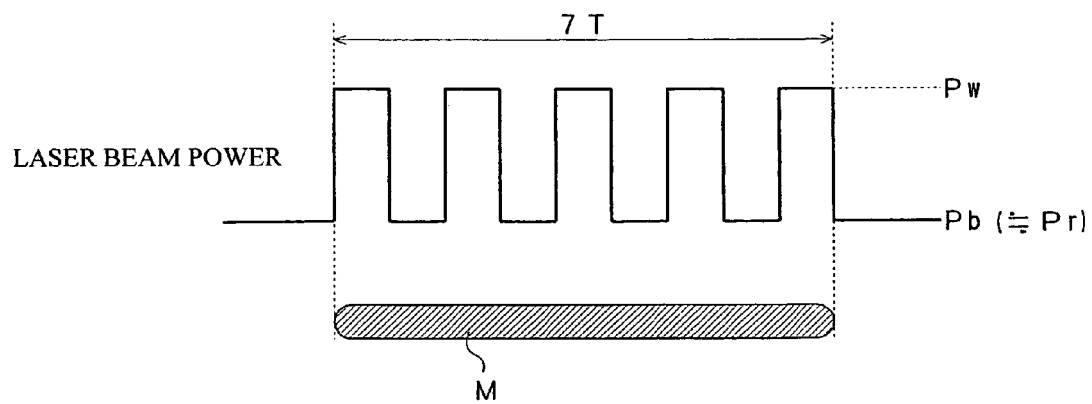
FIG. 15 is a diagram showing a typical pulse train pattern used for recording data in a DVD-R including a recording layer containing an organic dye.

As shown in FIG. 4, the single pulse pattern is employed as the second pulse train pattern and the second pulse train pattern is set so that the power of a laser beam becomes equal to the recording power Pw at a region where a recording mark M is to be formed and the power of a laser beam becomes equal to the bottom power Pb higher than the reproducing power Pr at a blank region. In other words, the second pulse train pattern is constituted by increasing the bottom power Pb in the single pulse pattern shown in FIG. 14 from a level substantially equal to the reproducing power Pr to the first bottom power Pb higher than the reproducing power Pr.

The recording power Pw is set to a high level such that the element contained in the first recording layer 31 as a primary component and the element contained in the second recording layer 32 as a primary component can be heated and mixed to form a record mark M when a laser beam having the recording power Pw is projected onto the optical recording medium 10. On the other hand, the first bottom power Pb is set to a low level such that it is higher than the reproducing power Pr but the element contained in the first recording layer 31 as a primary component and the element contained in the second recording layer 32 as a primary component cannot substantially be mixed when a laser beam having the first bottom power Pb is projected onto the optical recording medium 10.

In this case, as the level of the bottom power Pb becomes higher, since the heating of the first recording layer 31 and the second recording layer 32 by a laser beam whose power is set to the recording power Pw is augmented by a laser beam whose power is set to the bottom power Pb, it is possible to form a recording mark M and record data using a laser beam L10 having a low recording power Pw. On the other hand, in the case where the level of the bottom power Pb is too high, there arises a risk of the laser beam whose power is set to the bottom power Pb causing the element contained in the first recording layer 31 as a primary component and the element contained in the second recording layer 32 as a primary component to mix with each other at a blank region where no recording mark M is to be formed.

Therefore, it is also preferable in the second pulse train pattern to set the level of the bottom power Pb of a laser beam as high as possible insofar as a reproduced signal having a sufficient amplitude can be obtained.

Since the second pulse train pattern is the single pulse pattern, in the case where the power of a laser beam L10 is modulated using the second pulse train pattern, it is preferable to cause each recording mark M to be readily affected by heat from recording marks adjacent thereto along the longitudinal direction of the track in order to lower the recording power Pw. Therefore, the second pulse train pattern is a pattern for modulating a laser beam L10 which is suitable for the case where the time required for the passage of a laser beam through the shortest blank region is very short, in other words, where the ratio of the length of the shortest blank region to the linear recording velocity is small, for example the case where the ratio of the length of the shortest blank region to the linear recording velocity is equal to or smaller than 10 nsec.

Data for identifying the first pulse train pattern and the second pulse train pattern are preferably recorded in the optical recording medium 10 together with data for identifying various recording conditions of data, such as a linear recording velocity necessary for recording data, as data for setting recording conditions in the form of wobbles or pre-pits.

Figure 5:
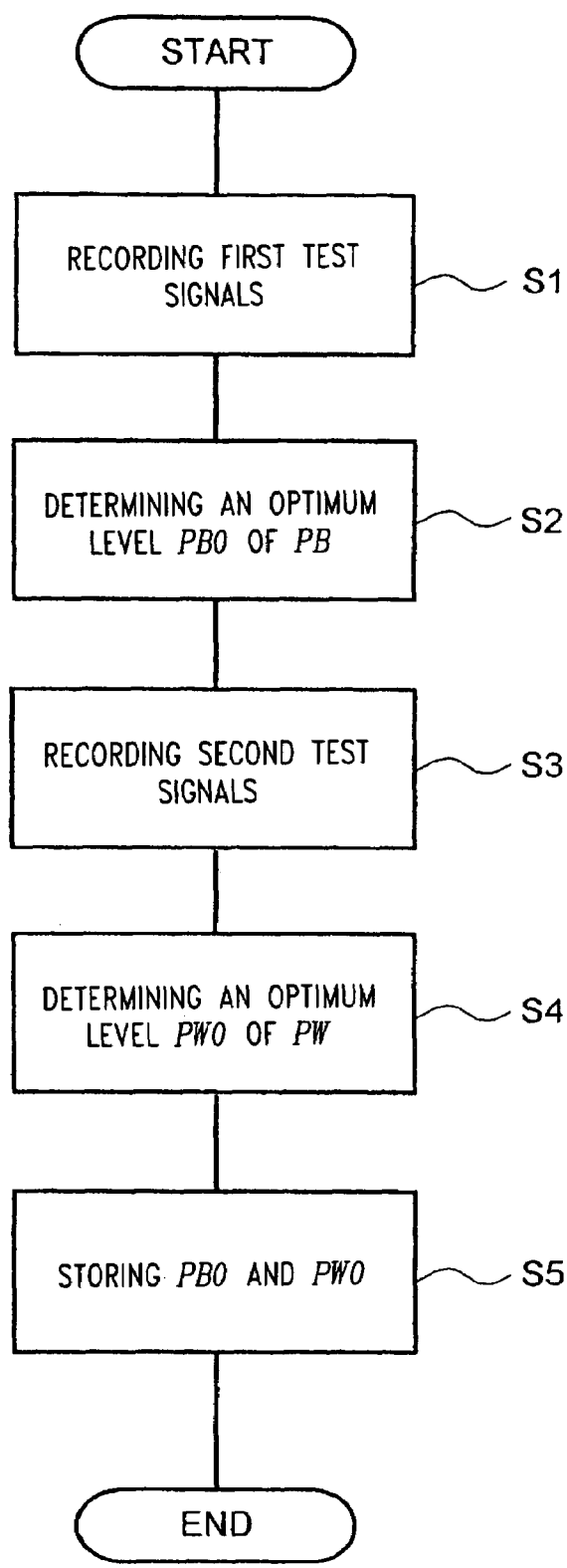
FIG. 5 is a flow chart showing a method for determining an optimum level of a recording power Pw and an optimum level of a bottom power Pb of a pulse train pattern for modulating the power of a laser beam.

FIG. 5 is a flow chart showing a method for determining an optimum level of the recording power Pw and an optimum level of the bottom power Pb of a pulse train pattern for modulating the power of a laser beam.

In the first pulse train pattern and the second pulse train pattern, it is preferable to set the level of the bottom power Pb of the laser beam as high as possible insofar as a reproduced signal having a sufficient amplitude can be obtained. However, since the optimum level of the recording power Pw and the optimum level of the bottom power Pb greatly differ depending upon recording conditions of data such as the linear recording velocity, it is necessary to determine the optimum level of the recording power Pw and the optimum level of the bottom power Pb in accordance with recording conditions of data and concretely determine a pulse train pattern in which the levels of the recording power Pw and the bottom power Pb are set to be optimum.

Therefore, in this embodiment, prior to shipping an optical recording medium, the optimum level of the recording power Pw and the optimum level of the bottom power Pb are determined in the following manner and recorded in the optical recording medium as data for setting recording conditions.

First, a linear recording velocity used for recording data is input by the user in a data recording apparatus for recording data in an optical recording medium.

Then, an optical recording medium in which data are to be recorded is set in the data recording apparatus.

When the optical recording medium is set in the data recording apparatus, the data recording apparatus reads data for setting recording conditions recorded in the optical recording medium and selects the kind of pulse train pattern used for modulating the power of a laser beam based on the input linear recording velocity.

Then, the pulse train pattern is concretely determined by setting the level of the recording power Pw of the thus selected pulse train pattern to a predetermined level and setting the level of the bottom power Pb thereof to the same level as the reproducing power Pr and a first test signal is recorded in a power calibration area of the optical recording medium in which data are to be recorded using a laser beam whose power is modulated in accordance with the thus determined pulse train pattern. Here, the power calibration area refers to an area in which a first test signal or the like is recorded in order to determine the power of a laser beam and is provided at an inner circumferential portion or the like of an optical recording medium separately from an area in which data are to be recorded.

The level to which the recording power Pw is to be set is determined by the data recording apparatus in accordance with data for setting recording conditions recorded in the optical recording medium and the input linear recording velocity.

The first test signal may be a single signal or a random signal.

Here, in order to eliminate the influence of cross-talk of data, tracks adjacent to the track on which the first test signal is to be recorded are kept unrecorded.

Then, the first test signal is recorded in the power calibration area of the optical recording medium by a laser beam whose power is modulated using the pulse train pattern in which the level of the recording power Pw is fixed at a predetermined level and the level of the bottom power Pb is set to a level higher than the reproducing power Pr.

Similarly, the first test signals are sequentially recorded in the power calibration area of the optical recording medium by a laser beam whose power is modulated using the pulse train patterns in which the level of the recording power Pw is fixed at a predetermined level and the level of the bottom power Pb is set so as to gradually increase (Step S1).

Then, the first test signals recorded in the optical recording medium at Step S1 are reproduced and the amplitude of each of the reproduced signals corresponding to the difference between the reflectivity of a region where a recording mark M is formed and the reflectivity of a blank region is measured. In the case where the first test signal is a random signal, it is preferable to measure the amplitude of the longest recording mark M.

In the case where the level of the bottom power Pb is equal to or lower than a predetermined level Pb0, as the level of the bottom power Pb becomes higher, a region heated by a laser beam whose power is set to the recording powers Pw is susceptible to heating by a laser beam whose power is set to the bottom power Pb. Therefore, in the case where the level of the bottom power Pb is equal to or lower than the predetermined level Pb0, as the level of the bottom power Pb included in a pulse train pattern for modulating the power of a laser beam used for recording the first test signal is higher, the amplitude of a signal obtained by reproducing the first test signal becomes larger. To the contrary, in the case where the level of the bottom power Pb exceeds the predetermined level Pb0, as the level of the bottom power Pb becomes higher, the first recording layer 31 and the second recording layer 32 are liable to be heated even at a region which is to become a blank region, whereby the element contained in the first recording layer 31 as a primary component and the element contained in the second recording layer 32 as a primary component are liable to mix with each other. Therefore, in the case where the level of the bottom power Pb exceeds the predetermined level Pb0, as the level of the bottom power Pb included in a pulse train pattern for modulating the power of a laser beam used for recording the first test signal is higher, the amplitude of a signal obtained by reproducing the first test signal becomes smaller.

Accordingly, in the case of determining pulse train patterns so that the level of the bottom power Pb gradually increases starting from the level of the reproducing power Pr, modulating the power of a laser beam using the thus determined pulse train patterns and sequentially recording first test signals, the amplitude of a reproduced signal gradually increases until the level of the bottom power Pb reaches the predetermined level Pb0 and the amplitude of a reproduced signal gradually decreases after the level of the bottom power Pb exceeds the predetermined level Pb0.

In this embodiment, the optimum level of the bottom power Pb is determined as a predetermined level Pb0 determined such that the amplitude of a reproduced signal gradually increases until the level of the bottom power Pb reaches the level and that the amplitude of a reproduced signal gradually decreases after the level of the bottom power Pb exceeds the level (Step S2).

When the optimum level of the bottom power Pb has been determined in this manner, a second test signal is recorded in the power calibration area of the optical recording medium by a laser beam whose power is modulated using the pulse train pattern in which the level of the bottom power Pb is set to the optimum level Pb0 and the level of the recording power Pw is set to a level slightly higher than the optimum level Pb0 of the bottom power Pb, namely, a level equal to 1.5 times the optimum level Pb0 of the bottom power Pb.

The second test signal may be a single signal or a random signal but is preferably a random signal.

In this embodiment, the second test signal is recorded on three tracks adjacent to each other.

Further, the second test signal is recorded in the power calibration area of the optical recording medium by a laser beam whose power is modulated using the pulse train pattern in which the level of the bottom power Pb is fixed at the optimum level Pb0 and the level of the recording powers Pw is set to a level higher than the first set level.

Similarly, the second test signals are sequentially recorded in the power calibration area of the optical recording medium by a laser beam whose power is modulated using the pulse train patterns in which the level of the bottom power Pb is fixed at the optimum level Pb0 and the level of the recording power Pw is set so as to gradually increase (Step S3).

Then, the second test signals recorded at Step S3 are reproduced and characteristics of reproduced signals are measured. In this embodiment, as characteristics of reproduced signals, at least one of asymmetry, a β value, jitter and an error rate is measured.

Since jitter and an error rate are influenced by cross-talk of data, unlike asymmetry and a β value, in the case where it is preferable to consider the influence of cross-talk of data, it is preferable to select jitter and/or error rate as the characteristics of the reproduced signals to be measured.

In this manner, in the case of sequentially recording the second test signals in the power calibration area of the optical recording medium by a laser beam whose power is modulated using the pulse train pattern in which the level of the bottom power Pb is fixed at the optimum level Pb0 and the level of the recording power Pw is set so as to gradually increase and reproducing the thus recorded second test signals, when the level of the recording power Pw is equal to or lower than a predetermined level Pw0, the characteristics of the signal obtained by reproducing the second test signal becomes better as the level of the bottom power Pb included in the pulse train pattern for modulating the power of the laser beam used for recording the second test signals is higher, and when the level of the recording power Pw exceeds the predetermined level Pw0, the characteristics of the signal obtained by reproducing the second test signal becomes worse as the level of the bottom power Pb included in the pulse train pattern for modulating the power of the laser beam used for recording the second test signals is higher.

Therefore, in the case of determining pulse train patterns so that the level of the recording power Pw gradually increases starting from a level slightly higher than the optimum level Pb0 of the bottom power Pb, modulating the power of the laser beam using the thus determined pulse train pattern and sequentially recording the second test signals, the characteristics of the reproduced signal gradually improve until the level of the recording power Pw reaches the predetermined level Pw0 and gradually become worse after the level of the recording power Pw reaches and exceeds the predetermined level Pw0.

In this embodiment, the optimum level of the recording power Pw is determined as a predetermined level Pw0 determined such that the characteristics of the reproduced signal gradually improve until the level of the recording power Pw reaches the level and that the characteristics of the reproduced signal gradually become worse after the level of the recording power Pw exceeds the level (Step S4).

In this case, when it is preferable to consider the influence of cross-talk of data, the optimum level of the recording power Pw is determined based on the characteristics of a signal obtained by reproducing the second test signal recorded on the central track among three adjacent tracks.

The thus determined optimum level Pb0 of the bottom power Pb and optimum level Pw0 of the recording power Pw are recorded and stored in the optical recording medium together with a linear recording velocity and a pulse train pattern as data for setting recording conditions (Step S5).

As occasion demands, a different linear recording velocity is input so that a corresponding pulse train pattern is selected and the optimum level Pb0 of the bottom power Pb and the optimum level Pw0 of the recording power Pw are determined, recorded and stored in the optical recording medium together with the linear recording velocity and the pulse train pattern.

According to this embodiment, since the optimum level Pb0 of the bottom power Pb of a pulse train pattern for modulating the power of a laser beam is determined so that the amplitude of a signal obtained by reproducing the first test signal becomes maximum, it is possible record data in an optical recording medium in a desired manner using a semiconductor laser having a relatively low output without using an expensive semiconductor laser having a high output.

Further, according to this embodiment, since the optimum level Pw0 of the recording power Pw of a pulse train pattern for modulating the power of a laser beam is determined so that the characteristics of a signal obtained by reproducing the second test signal becomes best, it is possible to record data in an optical recording medium so as to reproduce a signal having good characteristics.

Furthermore, according to this embodiment, the optimum level Pb0 of the bottom power Pb and the optimum level Pw0 of the recording power Pw are determined prior to shipping an optical recording medium and they are recorded and stored in the optical recording medium together with the linear recording velocity and the pulse train pattern. Therefore, even if the data recording apparatus used by the user for recording data is not capable of determining a pulse train pattern corresponding to the linear recording velocity, optimum level Pb0 of the bottom power Pb and optimum level Pw0 of the recording power Pw, it is nevertheless possible to modulate the power of the laser beam by a pulse train pattern in which the levels of the bottom power Pb and the recording power Pw are set to their optimum levels Pb0 and Pw0 in accordance with a linear recording velocity and record data in an optical recording medium. Therefore, it is possible to record data in a desired manner using a semiconductor laser having a relatively low output without using an expensive semiconductor laser having a high output and reproduce data having good characteristics.

Figure 6:
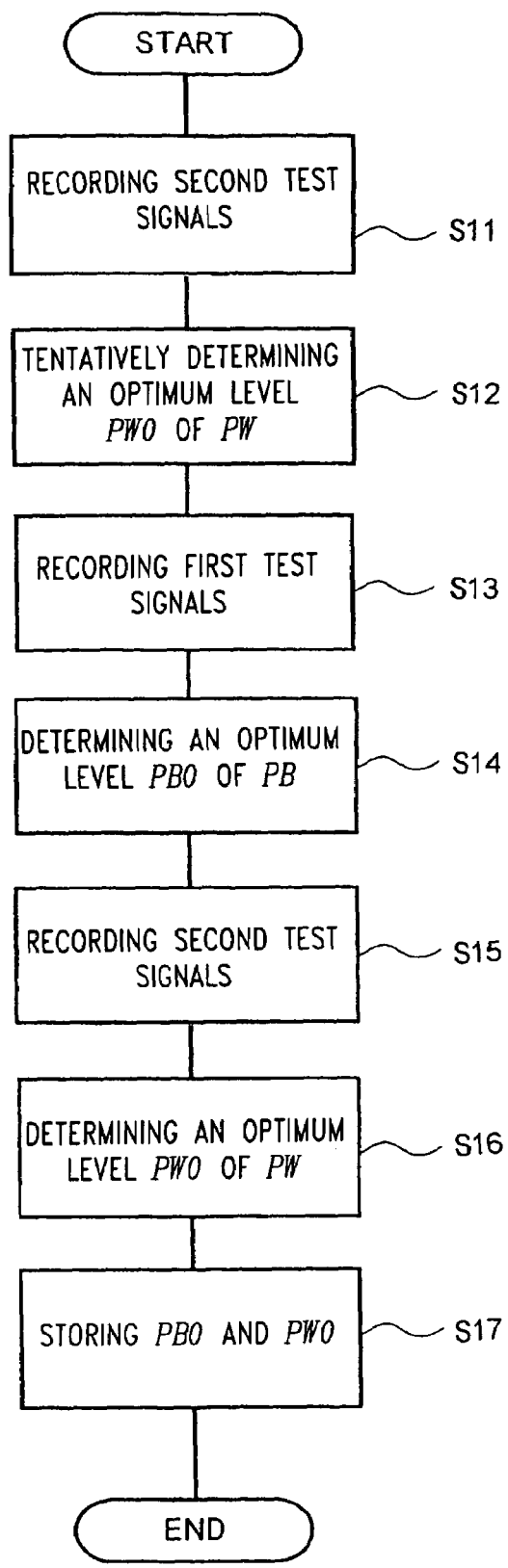
FIG. 6 is a flow chart showing a method for determining an optimum level of a recording power Pw and an optimum level of a bottom power Pb of a pulse train pattern for modulating the power of a laser beam in another preferred embodiment of the present invention.

FIG. 6 is a flow chart showing a method for determining the optimum level of the recording power Pw and the optimum level of the bottom power Pb of a pulse train pattern for modulating the power of a laser beam in another preferred embodiment of the present invention.

In this embodiment, the linear recording velocity used for recording data is first input by the operator in a data recording apparatus for recording data in an optical recording medium.

Then, an optical recording medium in which data are to be recorded is set in the data recording apparatus.

When the optical recording medium is set in the data recording apparatus, the data recording apparatus reads data for setting recording conditions recorded in the optical recording medium and determines a pulse train pattern used for modulating the power of a laser beam based on the input linear recording velocity.

Then, similarly to Step S3 shown in FIG. 5, the power of the laser beam is modulated using pulse train patterns in which the level of the bottom power Pb is fixed at the same level as that of the reproducing power Pr and the level of the recording power Pw is different and second test signals are recorded in the power calibration area of the optical recording medium (Step S11). The optimum level of the recording power Pw is tentatively determined based on characteristics signals obtained by reproducing the second test signals (Step S12).

When the optimum level of the recording power Pw has been tentatively determined, similarly to Step S1 shown in FIG. 5, the power of the laser beam is modulated using pulse train patterns in which the level of the recording power Pw is fixed at the thus tentatively determined optimum level and the level of the bottom power Pb is different and first test signals are recorded in the power calibration area of the optical recording medium (Step S13). Then, the optimum level Pb0 of the bottom power Pb is determined based on characteristics signals obtained by reproducing the first test signals (Step S14).

Then, similarly to Step S3 shown in FIG. 5, the power of the laser beam is modulated using pulse train patterns in which the level of the bottom power Pb is fixed at the optimum level Pb0 and the level of the recording power Pw is different and second test signals are recorded in the power calibration area of the optical recording medium (Step S15). The optimum level Pw0 of the recording power Pw is finally determined based on characteristics of signals obtained by reproducing the second test signals (Step S16).

The thus determined optimum level Pb0 of the bottom power Pb and optimum level Pw0 of the recording power Pw are recorded and stored in the optical recording medium together with a linear recording velocity and a pulse train pattern as data for setting recording conditions (Step S17).

As occasion demands, a different linear recording velocity is input so that a corresponding pulse train pattern is selected and the optimum level Pb0 of the bottom power Pb and the optimum level Pw0 of the recording power Pw are determined, recorded and stored in the optical recording medium together with the linear recording velocity and the pulse train pattern.

According to this embodiment, since the optimum level of the recording power Pw is first determined when the level of the bottom power Pb is set to the same level as that of the reproducing power Pr and the level of the recording power Pw is fixed at the thus determined optimum level, whereby the optimum level Pb0 of the bottom power Pb is determined, the level of the bottom power Pb can be determined to be a more adequate level. Therefore, the level of the recording power Pw is fixed at the thus determined optimum level to determine the optimum level Pw0 of the recording power Pw, whereby the level of the recording power Pw can be also determined to be a more adequate level.

Figure 7:
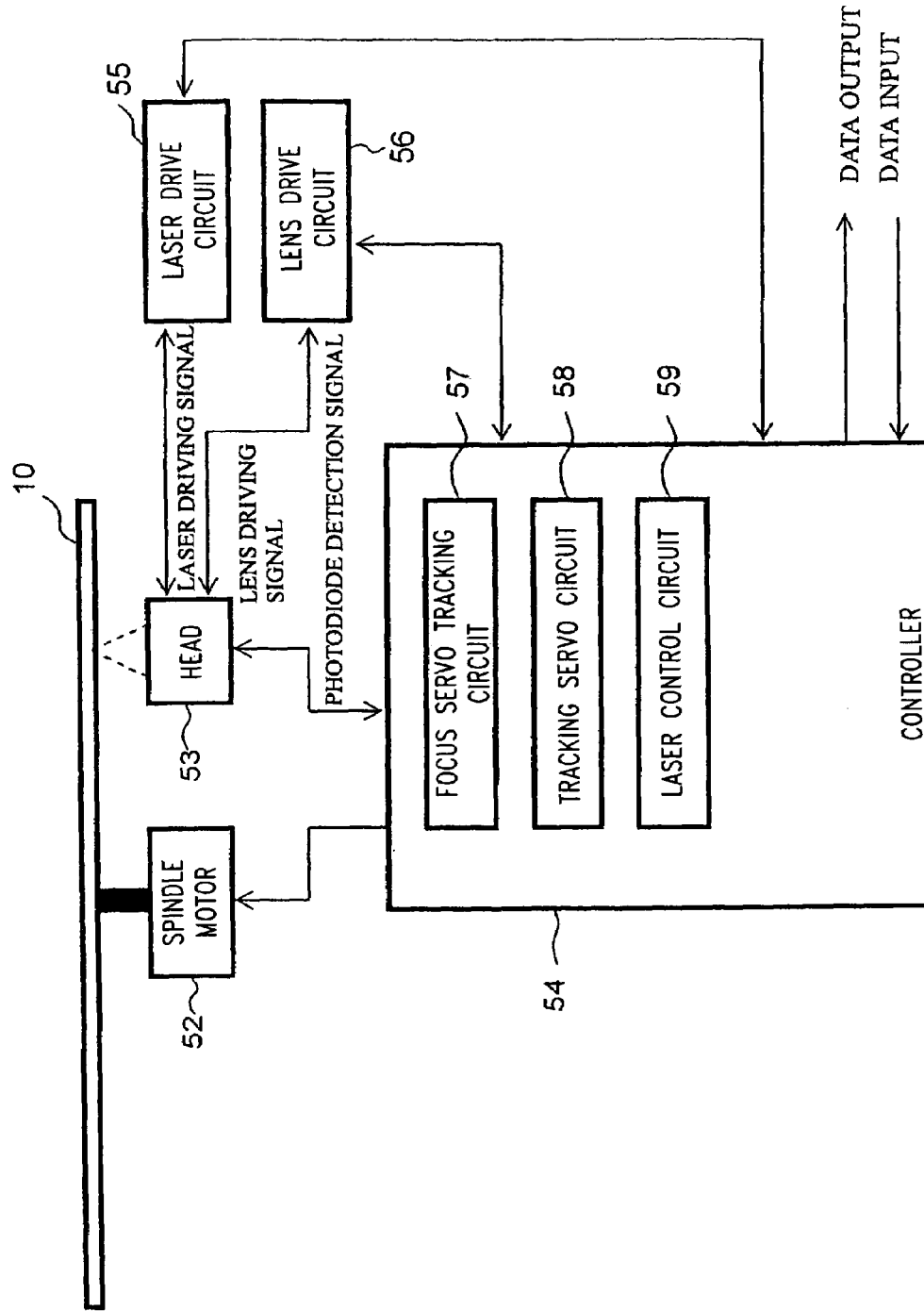
FIG. 7 is a block diagram showing a data recording and reproducing apparatus that is a preferred embodiment of the present invention.

FIG. 7 is a block diagram showing a data recording apparatus that is a preferred embodiment of the present invention.

As shown in FIG. 7, a data recording apparatus 50 according to this embodiment includes a spindle motor 52 for rotating the optical recording medium 10, a head 53 for projecting a laser beam onto the optical recording medium 10 and receiving the light reflected by the optical recording medium 10, a controller 54 for controlling the operation of the spindle motor 52 and the head 53, a laser drive circuit 55 for feeding a laser drive signal to the head 53, and a lens drive circuit 56 for feeding a lens drive signal to the optical head 53.

As shown in FIG. 7, the controller 54 includes a focus servo tracking circuit 57, a tracking servo circuit 58 and a laser control circuit 59.

When the focus servo tracking circuit 57 is activated, a laser beam L10 is focused onto the first recording layer 31 of the rotating optical recording medium 10 and when the tracking servo circuit 58 is activated, the spot of the laser beam L10 automatically follows the track of the optical recording medium 10.

As shown in FIG. 7, each of the focus servo tracking circuit 57 and the tracking servo circuit 58 has an auto-gain control function for automatically adjusting the focus gain and an auto-gain control function for automatically adjusting the tracking gain.

Further, the laser control circuit 59 is adapted to generate a laser drive signal to be supplied by the laser drive circuit 55.

In this embodiment, data for identifying the first pulse train pattern or the second pulse train pattern in accordance with a linear recording velocity of data are recorded in the optical recording medium 10 together with data for identifying various recording conditions, such as a linear recording velocity necessary for recording data, as data for setting recording conditions in the form of wobbles or pre-pits.

When data are to be recorded in the optical recording medium 10, the optical recording medium 10 is first set in the data recording apparatus and a linear recording velocity of data is input by the user.

The thus input linear recording velocity is output to the laser control circuit 59.

The laser control circuit 59 reads data for setting recording conditions recorded in the optical recording medium 10 and selects the first pulse train pattern or the second pulse train pattern based on the input linear recording velocity to output it to the laser drive circuit 55.

Based on a table stored in a memory (not shown), the laser control circuit 59 further sets the level of the recording power Pw to a predetermined level and the level of the bottom power Pb to the same level as that of the reproducing power Pr, thereby producing a power level setting signal that it outputs to the laser drive circuit 55.

The laser drive circuit 55 controls the head 53 based on the thus input pulse train pattern and power level setting signal and causes it to record a first test signal in a power calibration area of the optical recording medium 10 using a laser beam whose power is modulated in accordance with the pulse train pattern in which the level of the recording power Pw is set to the predetermined level and the level of the bottom power Pb is set to the same level as that of the reproducing power Pr.

Then, the laser control circuit 59 maintains the level of the recording power Pw at the predetermined level and sets the level of the bottom power Pb to a level higher than that of the reproducing power Pr, thereby producing a power level setting signal that it outputs to the laser drive circuit 55.

The laser drive circuit 55 controls the head 53 based on the thus input power level setting signal and causes it to record a first test signal in another power calibration area of the optical recording medium 10 using a laser beam whose power is modulated in accordance with the pulse train pattern determined based on the power level setting signal.

Similarly, the laser control circuit 59 maintains the level of the recording power Pw at the predetermined level and sequentially sets the level of the bottom power Pb so as to gradually increase, thereby sequentially producing and outputting power level setting signals. As a result, the laser drive circuit 55 causes the head 53 to record a first test signal in a different power calibration area of the optical recording medium 10 using a laser beam whose power is modulated in accordance with the pulse train pattern determined based on each of the power level setting signals.

When the recording of the first test signals has been completed in this manner, the laser control circuit 59 reproduces the first test signals recorded in the power calibration area of the optical recording medium 10 and measures the amplitudes of the reproduced signals, i.e., the difference in reflectivity between regions where a recording marks M are formed and blank regions, thereby determining the optimum level of Pb0 of the bottom power Pb as the level of the bottom power Pb when the amplitude of the reproduced signal becomes maximum.

When the optimum level of Pb0 of the bottom power Pb has been determined, the laser control circuit 59 sets the level of the bottom power Pb to the optimum level of Pb0 and sets the level of the recording power Pw to a level slightly higher than the optimum level of Pb0 of the bottom power Pb, namely, a level 1.5 times the optimum level of Pb0 of the bottom power Pb, thereby producing a power level setting signal that it outputs to the laser drive circuit 55.

The laser drive circuit 55 controls the head 53 based on the thus input power level setting signal and causes it to record second test signals on three tracks adjacent to each other in the power calibration area of the optical recording medium 10 using a laser beam whose power is modulated in accordance with the pulse train pattern determined based on the power level setting signal.

Then, the laser control circuit 59 maintains the level of the recording power Pw at a level slightly higher than the optimum level of Pb0 and sets the level of the recording power Pw to a level higher than the first set level, thereby producing a power level setting signal that it outputs to the laser drive circuit 55.

The laser drive circuit 55 controls the head 53 based on the thus input power level setting signal and causes it to record second test signals in different regions on the three tracks adjacent to each other in the power calibration area of the optical recording medium 10 using a laser beam whose power is modulated in accordance with the pulse train pattern determined based on the power level setting signal.

Similarly, the laser control circuit 59 maintains the level of the bottom power Pb at the optimum level Pb0 and sequentially sets the level of the recording power Pw so as to gradually increase, thereby sequentially producing and outputting power level setting signals. As a result, the laser drive circuit 55 causes the head 53 to record a second test signal in a different region on the adjacent three tracks in the power calibration area of the optical recording medium 10 using a laser beam whose power is modulated in accordance with the pulse train pattern determined based on each of the power level setting signals.

Thus, when the recording of the second test signals has been completed, the laser control circuit 59 reproduces the second test signals recorded in the power calibration area of the optical recording medium 10 and measures the characteristics of each of the reproduced signals, namely, asymmetry, a β value, jitter and an error rate, thereby determining an optimum level of Pw0 of the recording power Pw as the level of the recording power Pw when the characteristics of the reproduced signals become best.

The laser control circuit 59 stores the thus determined optimum level of Pw0 of the recording power Pw and optimum level of Pb0 of the bottom power Pb in the memory (not shown) together with the linear recording velocity as data for setting recording conditions and produces a laser drive signal based on the optimum level of Pw0 of the recording power Pw and the optimum level of Pb0 of the bottom power Pb to output it to the head 53 through the laser drive circuit 55. As a result, the power of the laser beam is modulated in accordance with the laser drive signal and data are recorded in the optical recording medium 10.

In this manner, data are recorded in the optical recording medium 10 in accordance with a desired recording strategy.

According to this embodiment, since the optimum level Pb0 of the bottom power Pb of a pulse train pattern for modulating the power of a laser beam is determined so that the amplitude of a signal obtained by reproducing the first test signal becomes maximum, it is possible record data in an optical recording medium in a desired manner using a semiconductor laser having a relatively low output without using an expensive semiconductor laser having a high output.

Further, according to this embodiment, since the optimum level Pw0 of the recording power Pw of a pulse train pattern for modulating the power of a laser beam is determined so that the characteristics of a signal obtained by reproducing the second test signal becomes best, it is possible to record data in an optical recording medium so as to reproduce a signal having good characteristics.

Furthermore, according to this embodiment, since the optimum level of Pw0 of the recording power Pw and the optimum level of Pb0 of the bottom power Pb determined in this manner are stored in the memory (not shown) together with the linear recording velocity as data for setting recording conditions, in the case where data are to be recorded in the same optical recording medium 10 at the same linear recording velocity, it is possible to set the level of the recording power Pw and the level of the bottom power Pb to their optimum levels Pw0 and Pb0 by reading the data for setting recording conditions stored in the memory without newly determining the optimum level of Pw0 of the recording power Pw and the optimum level of Pb0 of the bottom power Pb and it is therefore possible to record data in the optical recording medium 10 in a simple manner.

WORKING EXAMPLES AND A COMPARATIVE EXAMPLE

Hereinafter, working examples and a comparative example will be set out in order to further clarify the advantages of the present invention.

Fabrication of an Optical Recording Medium

An optical recording medium having the same configuration as that of the optical recording medium 1 shown in FIG. 1 was fabricated in the following manner.

A polycarbonate substrate having a thickness of 1.1 mm and a diameter of 120 mm was first set on a sputtering apparatus. Then, a reflective layer containing a mixture of Ag, Pd and Cu and having a thickness of 100 nm, a second dielectric layer containing a mixture of ZnS and $SiO_2$ and having a thickness of 30 nm, a second recording layer containing Cu as a primary component and having a thickness of 5 nm, a first recording layer containing Si as a primary component and having a thickness of 5 nm and a first dielectric layer containing the mixture of ZnS and $SiO_2$ and having a thickness of 25 nm were sequentially formed on the polycarbonate substrate using the sputtering process.

The mole ratio of ZnS to $SiO_2$ in the mixture of ZnS and $SiO_2$ contained in the first dielectric layer and the second dielectric layer was 80:20.

Further, the first dielectric layer was coated using the spin coating method with an acrylic ultraviolet ray curable resin to form a coating layer and the coating layer was irradiated with ultraviolet rays, thereby curing the acrylic ultraviolet ray curable resin to form a light transmission layer having a thickness of 100 μm.

Working Example 1

The thus fabricated optical recording medium was set in an optical recording medium evaluation apparatus "DDU1000" (Product Name) manufactured by Pulstec Industrial Co., Ltd. Then, a blue laser beam having a wavelength of 405 nm was employed as the laser beam for recording data and the laser beam was condensed onto the optical recording medium via the light transmission layer using an objective lens whose numerical aperture was 0.85, and a random signal including a 2T signal to an 8T signal in no particular order was recorded therein as a first test signal under the following recording signal conditions.

Modulation Code: (1.7) RLL
Linear Recording Velocity: 5.3 m/sec
Channel Clock: 66 MHz As a pulse train pattern for modulating the power of a laser beam, the first pulse train shown in FIG. 3 was selected. The level of the recording power Pw was fixed at 3.5 mW and the level of bottom power Pb was stepwise increased from 0.5 mW to 2.3 mW, thereby concretely determining respective first pulse train patterns. Then, the power of the laser beam was modulated in accordance with the thus determined first pulse train patterns and the first test signals were recorded in the optical recording medium.

Here, tracks on both sides of a track on which the first test signals were recorded were maintained unrecorded.

Under these recording conditions, the data transfer rate was about 36 Mbps when the format efficiency was 80% and the time required for the passage of the laser beam through the shortest blank region (shortest blank region interval/linear recording velocity) was about 30.6 nsec.

The thus recorded first test signals were reproduced and the amplitude of each of the reproduced signals was measured.

Figure 8:
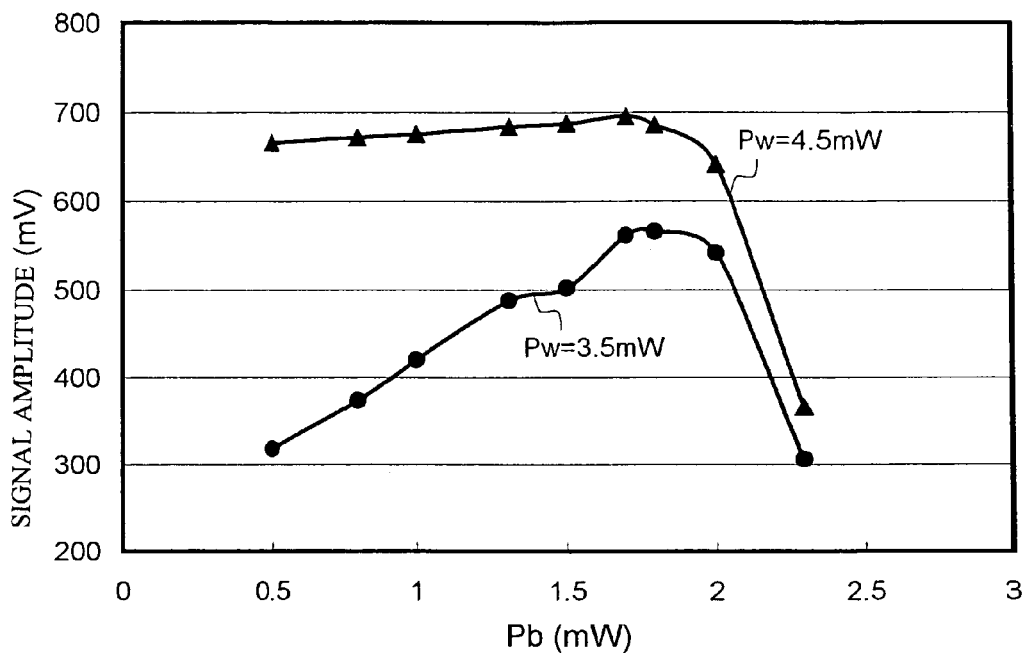
FIG. 8 is a graph showing the relationship between amplitude of a reproduced signal and level of a bottom power Pb measured in each of Working Example 1 and Working Example 2.

The relationship between the thus measured amplitude of each of the reproduced signals and the levels of the bottom power Pb is shown in FIG. 8.

Working Example 2

The first test signals were recorded in the optical recording medium similarly to in Working Example 1 except that the level of the recording power Pw was set to 4.5 mW and the thus recorded first test signals were reproduced to measure the amplitude of each of the reproduced signals.

The relationship between the thus measured amplitude of each of the reproduced signals and the levels of the bottom power Pb is shown in FIG. 8.

As shown in FIG. 8, it was found that in both cases of fixing the level of the recording power Pw at 3.5 mW and the level of the recording power Pw at 4.5 mW, when the level of the bottom power Pb was set to be equal to or lower than 1.7 mW, the amplitude of the reproduced signal became larger as the level of the bottom power Pb became higher and when the level of the bottom power Pb was set higher than 1.7 mW, the amplitude of the reproduced signal became smaller as the level of the bottom power Pb became higher and it was found that the amplitude of the reproduced signal became maximum when the level of the bottom power Pb was set to 1.7 mW.

Since the amplitude of the reproduced signal corresponds to the difference in reflectivity between regions where recording marks M were formed and blank regions, it is preferable for the amplitude of the reproduced signal to be larger and therefore, it was found that the optimum level of the bottom power Pb was 1.7 mW.

Working Example 3

Then, the optical recording medium fabricated in Working Example 1 was again set in the optical recording medium evaluation apparatus "DDU1000" (Product Name) manufactured by Pulstec Industrial Co., Ltd. Next, a blue laser beam having a wavelength of 405 nm was employed as the laser beam for recording data and the laser beam was condensed onto the optical recording medium via the light transmission layer using an objective lens whose numerical aperture was 0.85, and a random signal including a 2T signal to an 8T signal in no particular order was recorded on three tracks adjacent to each other of the optical recording medium as a second test signal under the following recording signal conditions.

Modulation Code: (1.7) RLL
Linear Recording Velocity: 5.3 m/sec
Channel Clock: 66 MHz As a pulse train pattern for modulating the power of a laser beam, the first pulse train shown in FIG. 3 was selected. The level of the bottom power Pb was fixed at 1.7 mW which was determined as the optimum level in Working Examples 1 and 2 and the level of the recording power Pw was stepwise increased from 3.3 mW to 5.7 mW, thereby concretely determining respective first pulse train patterns. Then, the power of the laser beam was modulated in accordance with the thus determined first pulse train patterns and the second test signals were recorded on the three tracks adjacent to each other of the optical recording medium.

Then, the second test signals recorded on a central track among the second test signals recorded on the three tracks adjacent to each other were reproduced and clock jitter of each of the reproduced signals was measured. The fluctuation $\sigma$ of the reproduced signal was measured using a time interval analyzer manufactured by Yokogawa Electric Corporation and the clock jitter was calculated as $\sigma/Tw$, where Tw was one clock period.

Figure 9:
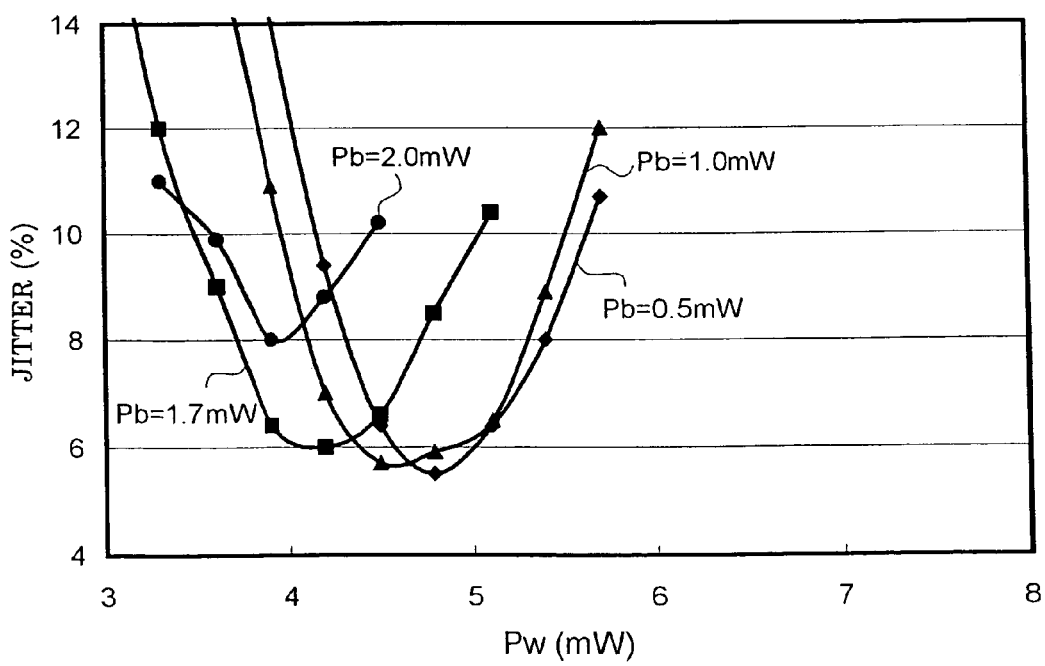
FIG. 9 is a graph showing the relationship between clock jitter and level of a recording power Pw measured in each of Working Example 3 and Comparative Examples 1 to 3.

The relationship between the thus measured clock jitter and the levels of the recording power Pw is shown in FIG. 9.

Comparative Example 1

The second test signals were recorded in the optical recording medium in the manner of Working Example 3 except that the level of the bottom power Pb was fixed at 0.5 mW and the thus recorded second test signals were reproduced to measure clock jitter of each of the reproduced signals.

The relationship between the thus measured clock jitter and the levels of the recording power Pw is shown in FIG. 9.

Comparative Example 2

The second test signals were recorded in the optical recording medium in the manner of Working Example 3 except that the level of the bottom power Pb was fixed at 1.0 mW and the thus recorded second test signals were reproduced to measure clock jitter of each of the reproduced signals.

The relationship between the thus measured clock jitter and the levels of the recording power Pw is shown in FIG. 9.

Comparative Example 3

The second test signals were recorded in the optical recording medium in the manner of Working Example 3 except that the level of the bottom power Pb was fixed at 2.0 mW and the thus recorded second test signals were reproduced to measure clock jitter of each of the reproduced signals.

The relationship between the thus measured clock jitter and the levels of the recording power Pw is shown in FIG. 9.

As shown in FIG. 9, it was found that in each of cases of setting the level of the bottom power Pb to 0.5 mW, setting the level of the bottom power Pb to 1.0 mW and setting the level of the bottom power Pb to 1.7 mW which was the optimum level, the minimum value of clock jitter of the reproduced signal was about 6% and clock jitter could be suppressed to a sufficiently low value but that in the case of setting the level of the bottom power Pb to 2.0 mW, the minimum value of clock jitter of the reproduced signal was about 8% and clock jitter could not be suppressed to a low value.

Further, it was found that the level of the recording power Pw at which clock jitter became minimum was 4.8 mW in the case of setting the level of the bottom power Pb to 0.5 mW, 4.5 mW in the case of setting the level of the bottom power Pb to 1.0 mW and 4.2 mW in the case of setting the level of the bottom power Pb to 1.7 mW which was the optimum level and that in the case of setting the level of the bottom power Pb to 1.7 mW which was the optimum level, clock jitter of the reproduced signal could be minimized at the lowest recording power Pw and it was and most preferable.

Therefore, it was found that in the case where data were recorded so that the data transfer rate was about 36 Mbps, the optimum level of the bottom power Pb was 1.7 mW and the optimum level of the recording power Pw was 4.2 mW.

Working Example 4

The first test signals were recorded in the optical recording medium fabricated in Working Example 1 similarly to in Working Example 1 except that the linear recording velocity was set to 10.6 m/sec, the channel clock was set to 132 MHz and the first test signals were recorded by modulating the power of the laser beam in accordance with the first pulse train patterns determined by fixing the level of the recording power Pw at 5.0 mW and stepwise increasing the level of the bottom power Pb from 0.5 mW to 2.5 mW.

Under these recording conditions, the data transfer rate was about 72 Mbps when the format efficiency was 80% and the time required for the passage of the laser beam through the shortest blank region (shortest blank region interval/ linear recording velocity) was about 15.1 nsec.

The thus recorded first test signals were reproduced and the amplitude of each of the reproduced signal was measured.

Figure 10:
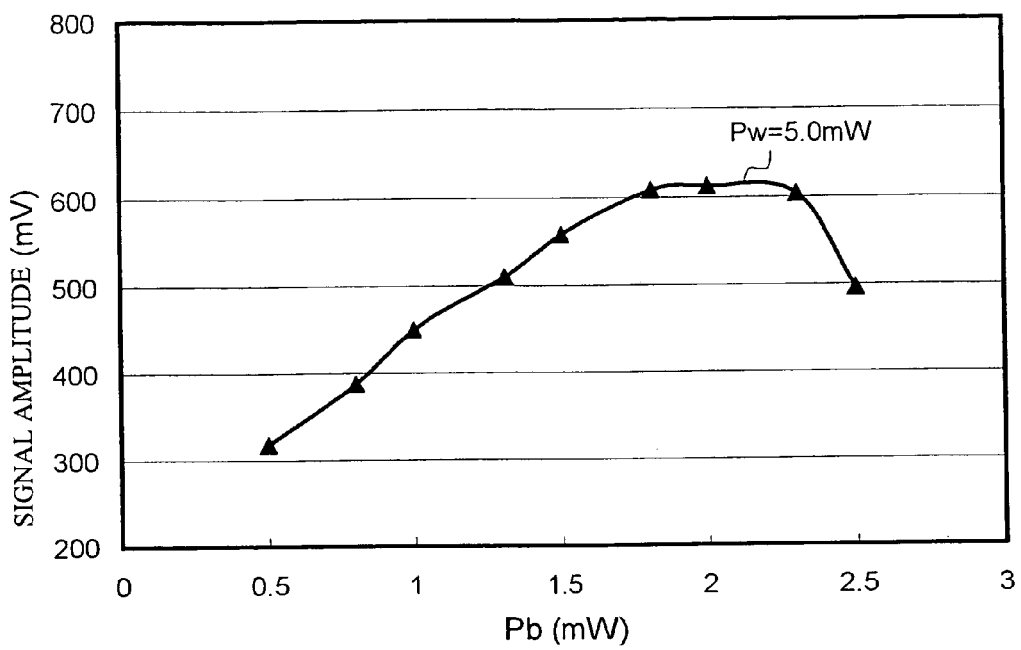
FIG. 10 is a graph showing the relationship between amplitude of a reproduced signal and level of a bottom power Pb measured in Working Example 4.

The relationship between the thus measured amplitude of each of the reproduced signals and the levels of the bottom power Pb is shown in FIG. 10.

As shown in FIG. 10, it was found that in the case of fixing the level of the recording power Pw at 5.0 mW, when the level of the bottom power Pb was set to be equal to or lower than 2.0 mW, the amplitude of the reproduced signal became larger as the level of the bottom power Pb became higher and when the level of the bottom power Pb was set higher than 2.0 mW, the amplitude of the reproduced signal became smaller as the level of the bottom power Pb became higher and it was found that the amplitude of the reproduced signal became maximum when the level of the bottom power Pb was set to 2.0 mW.

Therefore, it was found that when data were recorded under these recording conditions, the optimum level of the bottom power Pb was 2.0 mW.

Working Example 5

Then, the optical recording medium used in Working Example 4 was again set in the optical recording medium evaluation apparatus "DDU1000" (Product Name) manufactured by Pulstec Industrial Co., Ltd. Next, a blue laser beam having a wavelength of 405 nm was employed as the laser beam for recording data and the laser beam was condensed onto the optical recording medium via the light transmission layer using an objective lens whose numerical aperture was 0.85, and a random signal including a 2T signal to an 8T signal in no particular order was recorded on three tracks adjacent to each other of the optical recording medium as a second test signal under the following recording signal conditions.

Modulation Code: (1.7) RLL
Linear Recording Velocity: 10.6 m/sec
Channel Clock: 132 MHz As a pulse train pattern for modulating the power of a laser beam, the first pulse train shown in FIG. 3 was selected. The level of the bottom power Pb was fixed at 2.0 mW which was determined as the optimum level in Working Example 4 and the level of the recording power Pw was stepwise increased from 3.6 mW to 7.2 mW, thereby concretely determining respective first pulse train patterns. Then, the power of the laser beam was modulated in accordance with the thus determined first pulse train patterns and the second test signals were recorded on the three adjacent tracks of the optical recording medium.

Then, similarly to in Working Example 3, the second test signals recorded on a central track among the second test signals recorded on the three tracks adjacent to each other were reproduced and clock jitter of each of the reproduced signals was measured.

Figure 11:
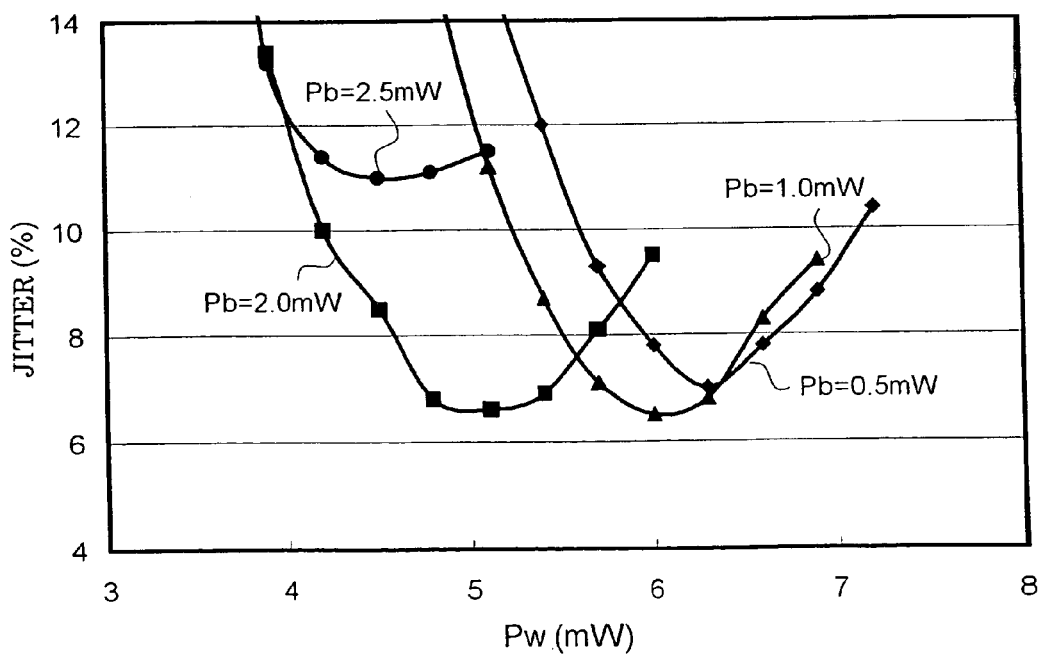
FIG. 11 is a graph showing the relationship between clock jitter and level of a recording power Pw measured in each of Working Example 5 and Comparative Examples 4 to 6.

The relationship between the thus measured clock jitter and the levels of the recording power Pw is shown in FIG. 11.

Comparative Example 4

The second test signals were recorded in the optical recording medium in the manner of Working Example 5 except that the level of the bottom power Pb was fixed at 0.5 mW and the thus recorded second test signals were reproduced to measure clock jitter of each of the reproduced signals.

The relationship between the thus measured clock jitter and the levels of the recording power Pw is shown in FIG. 11.

Comparative Example 5

The second test signals were recorded in the optical recording medium in the manner of Working Example 5 except that the level of the bottom power Pb was fixed at 1.0 mW and the thus recorded second test signals were reproduced to measure clock jitter of each of the reproduced signals.

The relationship between the thus measured clock jitter and the levels of the recording power Pw is shown in FIG. 11.

Comparative Example 6

The second test signals were recorded in the optical recording medium in the manner of Working Example 5 except that the level of the bottom power Pb was fixed at 2.5 mW and the thus recorded second test signals were reproduced to measure clock jitter of each of the reproduced signals.

The relationship between the thus measured clock jitter and the levels of the recording power Pw is shown in FIG. 11.

As shown in FIG. 11, it was found that in each of cases of setting the level of the bottom power Pb to 0.5 mW, setting the level of the bottom power Pb to 1.0 mW and setting the level of the bottom power Pb to 2.0 mW which was the optimum level, the minimum value of clock jitter of the reproduced signal was about 7% and clock jitter could be suppressed to a sufficiently low value but that in the case of setting the level of the bottom power Pb to 2.5 mW, the minimum value of clock jitter of the reproduced signal was about 11% and clock jitter could not be suppressed to a low value.

Further, it was found that the level of the recording power Pw at which clock jitter became minimum was 6.3 mW in the case of setting the level of the bottom power Pb to 0.5 mW, 6.0 mW in the case of setting the level of the bottom power Pb to 1.0 mW and 5.1 mW in the case of setting the level of the bottom power Pb to 2.0 mW which was the optimum level and that in the case of setting the level of the bottom power Pb to 2.0 mW which was the optimum level, clock jitter of the reproduced signal could be minimized at the lowest recording power Pw and it was most preferable.

Therefore, it was found that in the case where data were recorded so that the data transfer rate was about 72 Mbps, the optimum level of the bottom power Pb was 2.0 mW and the optimum level of the recording power Pw was 5.1 mW.

Working Example 6

The first test signals were recorded in the optical recording medium fabricated in Working Example 1 similarly to in Working Example 1 except that the linear recording velocity was set to 21.2 m/sec, the channel clock was set to 263 MHz and the first test signals were recorded by modulating the power of the laser beam in accordance with the first pulse train patterns determined by fixing the level of the recording power Pw at 4.0 mW and stepwise increasing the level of the bottom power Pb from 0.5 mW to 3.0 mW.

Under these recording conditions, the data transfer rate was about 144 Mbps when the format efficiency was 80% and the time required for the passage of the laser beam through the shortest blank region (shortest blank region interval/linear recording velocity) was about 7.6 nsec.

The thus recorded first test signals were reproduced and the amplitude of each of the reproduced signal was measured.

Figure 12:
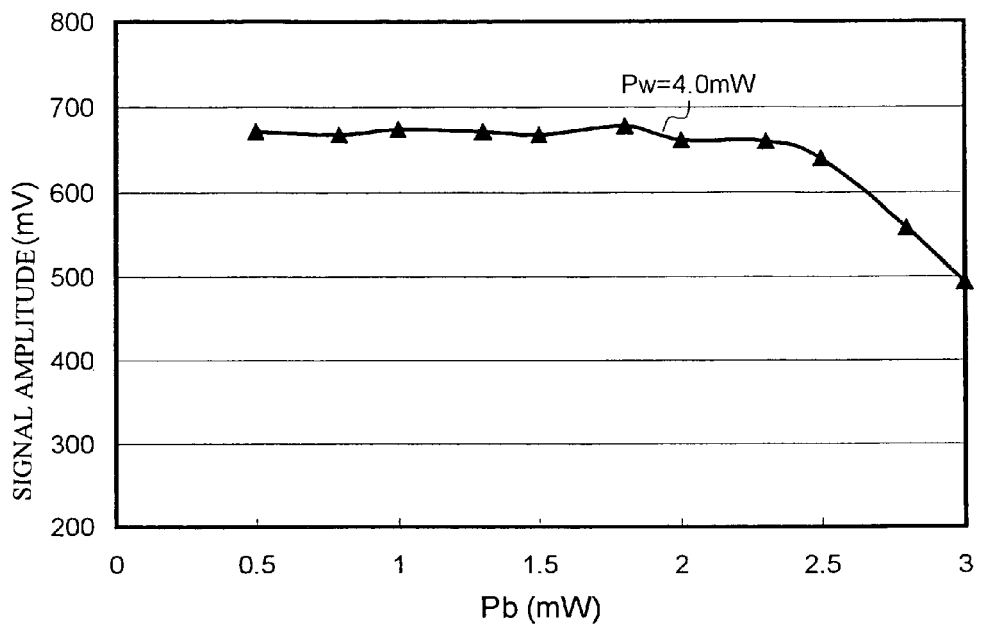
FIG. 12 is a graph showing the relationship between amplitude of a reproduced signal and level of a bottom power Pb measured in Working Example 6.

The relationship between the thus measured amplitude of each of the reproduced signals and the levels of the bottom power Pb is shown in FIG. 12.

As shown in FIG. 12, it was found that in the case of fixing the level of the recording power Pw at 4.0 mW, when the level of the bottom power Pb was set to 0.5 mW to 2.3 mW, the amplitude of the reproduced signal was substantially constant irrespective of the level of the bottom power Pb but when the level of the bottom power Pb was set higher than 2.3 mW, the amplitude of the reproduced signal became smaller as the level of the bottom power Pb became higher.

Therefore, it was found that when data were recorded under these recording conditions, the optimum level of the bottom power Pb could be expected to be 2.3 mW.

Working Example 7

Then, the optical recording medium used in Working Example 6 was again set in the optical recording medium evaluation apparatus "DDU1000" (Product Name) manufactured by Pulstec Industrial Co., Ltd. Next, a blue laser beam having a wavelength of 405 nm was employed as the laser beam for recording data and the laser beam was condensed onto the optical recording medium via the light transmission layer using an objective lens whose numerical aperture was 0.85, and a random signal including a 2T signal to an 8T signal in no particular order was recorded on three tracks adjacent to each other of the optical recording medium as a second test signal under the following recording signal conditions.

Modulation Code: (1.7) RLL
Linear Recording Velocity: 21.2 m/sec
Channel Clock: 263 MHz As a pulse train pattern for modulating the power of a laser beam, the first pulse train shown in FIG. 3 was selected. The level of the bottom power Pb was fixed at 2.3 mW which was expected to be the optimum level in Working Example 6 and the level of the recording power Pw was stepwise increased from 3.6 mW to 6.0 mW, thereby concretely determining respective first pulse train patterns. Then, the power of the laser beam was modulated in accordance with the thus determined first pulse train patterns and the second test signals were recorded on the three tracks adjacent to each other of the optical recording medium.

Then, similarly to in Working Example 3, the second test signals recorded on a central track among the second test signals recorded on the three adjacent tracks were reproduced and clock jitter of each of the reproduced signals was measured.

Figure 13:
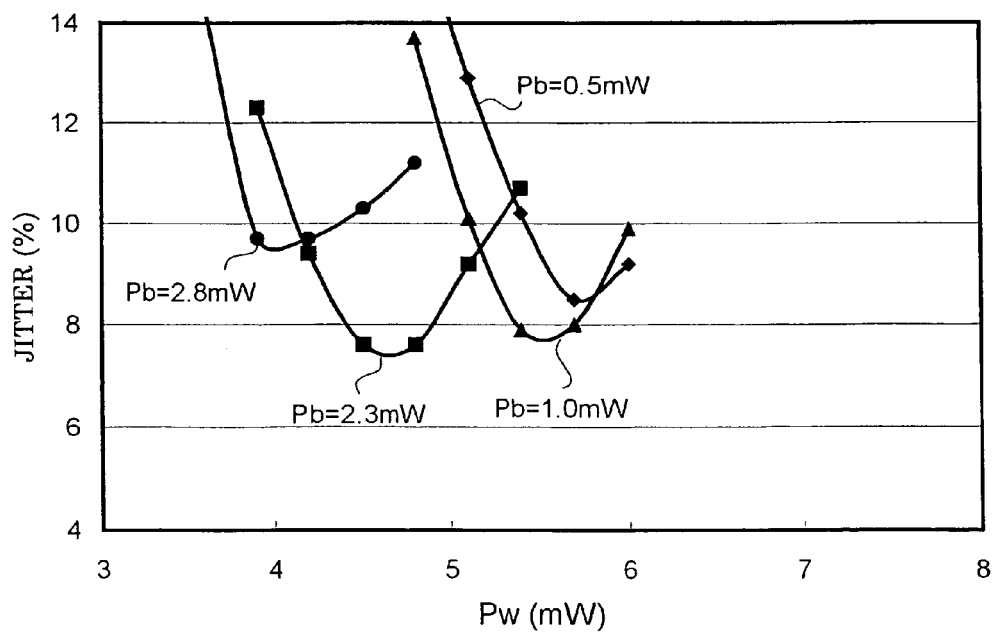
FIG. 13 is a graph showing the relationship between clock jitter and level of a recording power Pw measured in each of Working Example 7 and Comparative Examples 7 to 9.

The relationship between the thus measured clock jitter and the levels of the recording power Pw is shown in FIG. 13.

Comparative Example 7

The second test signals were recorded in the optical recording medium in the manner of Working Example 7 except that the level of the bottom power Pb was fixed at 0.5 mW and the thus recorded second test signals were reproduced to measure clock jitter of each of the reproduced signals.

The relationship between the thus measured clock jitter and the levels of the recording power Pw is shown in FIG. 13.

Comparative Example 8

The second test signals were recorded in the optical recording medium in the manner of Working Example 7 except that the level of the bottom power Pb was fixed at 1.0 mW and the thus recorded second test signals were reproduced to measure clock jitter of each of the reproduced signals.

The relationship between the thus measured clock jitter and the levels of the recording power Pw is shown in FIG. 13.

Comparative Example 9

The second test signals were recorded in the optical recording medium in the manner of Working Example 7 except that the level of the bottom power Pb was fixed at 2.8 mW and the thus recorded second test signals were reproduced to measure clock jitter of each of the reproduced signals.

The relationship between the thus measured clock jitter and the levels of the recording power Pw is shown in FIG. 13.

As shown in FIG. 13, it was found that in each of cases of setting the level of the bottom power Pb to 0.5 mW, setting the level of the bottom power Pb to 1.0 mW and setting the level of the bottom power Pb to 1.7 mW which was expected to be the optimum level, the minimum value of clock jitter of the reproduced signal was about 8% and clock jitter could be suppressed to a sufficiently low value but that in the case of setting the level of the bottom power Pb to 2.8 mW, the minimum value of clock jitter of the reproduced signal was about 10% and clock jitter could not be suppressed to a low value.

Further, it was found that the level of the recording power Pw at which clock jitter became minimum was 5.7 mW in the case of setting the level of the bottom power Pb to 0.5 mW, 5.4 mW in the case of setting the level of the bottom power Pb to 1.0 mW and 4.5 mW in the case of setting the level of the bottom power Pb to 1.7 mW which was expected to be the optimum level and that in the case of setting the level of the bottom power Pb to 2.3 mW, clock jitter of the reproduced signal could be minimized at the lowest recording power Pw and it was most preferable.

Therefore, it was found that in the case where data were recorded so that the data transfer rate was about 144 Mbps, the optimum level of the bottom power Pb was 2.3 mW and the optimum level of the recording power Pw was 4.5 mW.

The present invention has thus been shown and described with reference to a specific embodiment and Working Examples. However, it should be noted that the present invention is in no way limited to the details of the described arrangements but changes and modifications may be made without departing from the scope of the appended claims.

For example, in the above described embodiments and Working Examples, although the first recording layer 31 and the second recording layer 32 are formed in contact with each other, it is not absolutely necessary to form the first recording layer 31 and the second recording layer 32 in contact with each other but it is sufficient for the second recording layer 32 to be so located in the vicinity of the first recording layer 31 as to enable formation of a mixed region including the primary component element of the first recording layer 31 and the primary component element of the second recording layer 32 when the region is irradiated with a laser beam. Further, one or more other layers such as a dielectric layer may be interposed between the first recording layer 31 and the second recording layer 32.

Further, in the above described embodiments, although the first recording layer 31 contains an element selected from the group consisting of Si, Ge, Sn, Mg, In, Zn, Bi and Al as a primary component and the second recording layer 32 contains Cu as a primary component, it is not absolutely necessary for the first recording layer 31 to contain an element selected from the group consisting of Si, Ge, Sn, Mg, In, Zn, Bi and Al as a primary component and for the second recording layer 32 to contain Cu as a primary component and the first recording layer 31 may contain an element selected from the group consisting of Si, Ge, C, Sn, Zn and Cu as a primary component and the second recording layer 32 may contain Al as a primary component. Further, the first recording layer 31 may contain an element selected from the group consisting of Si, Ge, C and Al as a primary component and the second recording layer 32 may contain Zn as a primary component. Moreover, it is sufficient for the first recording layer 31 and the second recording layer 32 to contain different elements from each other and contain an element selected from the group consisting of Al, Si, Ge, C, Sn, Au, Zn, Cu, B, Mg, Ti, Mn, Fe, Ga, Zr, Ag and Pt as a primary component.

Furthermore, in the above described embodiments and Working Examples, although the optical recording medium 10 includes the first recording layer 31 and the second recording layer 32, the optical recording medium may include one or more recording layers containing an element selected from the group consisting of Si, Ge, Sn, Mg, In, Zn, Bi and Al as a primary component or one or more recording layers containing Al as a primary element, in addition to the first recording layer 31 and the second recording layer 32.

Moreover, in the above described embodiments and Working Examples, although the first recording layer 31 is disposed on the side of the light transmission layer 16 and the second recording layer 32 is disposed on the side of the substrate 11 in the above described embodiment and working examples, it is possible to dispose the first recording layer 31 on the side of the substrate 11 and the second recording layer 32 on the side of the light transmission layer 16.

Further, in the above described embodiments and Working Examples, the optical recording medium 10 includes the first dielectric layer 15 and the second dielectric layer 13 and the first recording layer 31 and the second recording layer 32 are disposed between the first dielectric layer 15 and the second dielectric layer 13. However, it is not absolutely necessary for the optical recording medium 10 to include the first dielectric layer 15 and the second dielectric layer 13, i.e., the optical recording medium 10 may include no dielectric layer. Further, the optical recording medium 10 may include a single dielectric layer and in such case the dielectric layer may be disposed on either the side of the substrate 11 or the side of the light transmission layer 16 with respect to the first recording layer 31 and the second recording layer 32.

Furthermore, in Working Examples, although the first recording layer 31 and the second recording layer 32 are formed so as to have the same thickness in the above described embodiment and working examples, it is not absolutely necessary to form the first recording layer 31 and the second recording layer 32 so as to have the same thickness.

Moreover, in the above described embodiments and Working Examples, although the optical recording medium 10 is provided with the reflective layer 12, if the level of reflected light in the recording mark M formed by the mixing an element contained in the first recording layer as a primary component and Zn contained in the second recording layer as a primary component and the level of reflected light in regions onto which the laser beam was not projected greatly differ from each other, the reflective layer may be omitted.

Further, in the above described embodiments, although the first pulse train pattern and the second pulse train pattern are employed, pulse train patterns usable in the present invention for modulating the power of a laser beam are not limited to the first pulse train pattern and the second pulse train pattern and the power of a laser beam can be modulated using another pulse train pattern. For example, the power of a laser beam can be modulated in accordance with a pulse train pattern constituted so as to include a second bottom power lower than the bottom power Pb and substantially equal to a reproducing power at one of front and rear portions of the pulse whose level is equal to a level corresponding to the recording power Pw in the first pulse train pattern and if the power of a laser beam is modulated using such a pulse train pattern, it is possible to effectively prevent the front edge portion and/or the rear edge portion of a recording mark M from shifting.

Furthermore, in the above described embodiments, although the data for setting recording conditions are recorded in the optical recording medium 10 in the form of wobbles or pre-pits, data for setting recording conditions may be recorded in the first recording layer 31 or the second recording layer 32.

Further, in the embodiment shown in FIG. 5, although the level of the bottom power Pb is fixed at the same level as that of the reproducing power Pr, it is not absolutely necessary to fix the level of the bottom power Pb at the same level as that of the reproducing power Pr and the bottom power Pb may be fixed at a level higher than the reproducing power Pr.

Moreover, in the embodiment shown in FIG. 7, although the focus servo tracking circuit 57, the tracking servo circuit 58 and the laser control circuit 59 are incorporated into the controller 54, it is not absolutely necessary to incorporate the focus servo tracking circuit 57, the tracking servo circuit 58 and the laser control circuit 59 into the controller 54, and the focus servo tracking circuit 57, the tracking servo circuit 58 and the laser control circuit 59 may be provided separately from the controller 54. Moreover, it is alternatively possible to install software for accomplishing functions of the focus servo tracking circuit 57, the tracking servo circuit 58 and the laser control circuit 59 in the controller 54.

Further, in the above described embodiments and Working Examples, although the explanation was made as to the case where data are recorded in a next-generation type optical recording medium 10 and where it is required to employ a semiconductor laser having a high output, the case to which the present invention can be applied is not limited to the case of recording data in a next-generation type optical recording medium but the present invention can also be widely applied to the case of recording data in a write-once type optical recording medium other than a next-generation type optical recording medium.

According to the present invention, it is possible to provide a method for determining a pattern for modulating a power of a laser beam which can determine a pattern for modulating the power of a laser beam so that data can be recorded in a write-once type optical recording medium with a laser beam having a low recording power at a high linear recording velocity.

Further, according to the present invention, it is possible to provide a method for determining a pattern for modulating a power of a laser beam which can determine a pattern for modulating the power of a laser beam so that data can be recorded in a write-once type optical recording medium at a high linear recording velocity using an inexpensive semiconductor laser having a low output.

Furthermore, according to the present invention, it is possible to provide a method for determining a pattern for modulating a power of a laser beam which can determine a pattern for modulating the power of a laser beam so that data can be recorded in a write-once type optical recording medium including two or more recording layers with a laser beam having a low recording power at a high linear recording velocity.

Moreover, according to the present invention, it is possible to provide an apparatus for recording data in an optical recording medium which can determine a pattern for modulating the power of a laser beam so that data can be recorded in a write-once type optical recording medium with a laser beam having a low recording power at a high linear recording velocity.

Further, according to the present invention, it is possible to provide an apparatus for recording data in an optical recording medium which can determine a pattern for modulating the power of a laser beam so that data can be recorded in a write-once type optical recording medium at a high linear recording velocity using an inexpensive semiconductor laser having a low output.

Furthermore, according to the present invention, it is possible to provide an apparatus for recording data in an optical recording medium which can determine a pattern for modulating the power of a laser beam so that data can be recorded in a write-once type optical recording medium including two or more recording layers with a laser beam having a low recording power at a high linear recording velocity.

Moreover, according to the present invention, it is possible to provide a write-once type optical recording medium which can determine a pattern for modulating the power of a laser beam so that data can be recorded therein with a laser beam having a low recording power at a high linear recording velocity.

Further, according to the present invention, it is possible to provide a write-once type optical recording medium which can determine a pattern for modulating the power of a laser beam so that data can be recorded therein at a high linear recording velocity using an inexpensive semiconductor laser having a low output.

Furthermore, according to the present invention, it is possible to provide a write-once type optical recording medium which include two or more recording layers and can determine a pattern for modulating the power of a laser beam so that data can be recorded therein at a high linear recording velocity using an inexpensive semiconductor laser having a low output.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for determining a pulse train pattern including a pulse whose level is set to a level corresponding to a level of a recording power set to be higher than a reproducing power and a pulse whose level is set to a level corresponding to a level of a bottom power set to be higher than the reproducing power and adapted for modulating the power of a laser beam used for recording data in a write-once type optical recording medium, the method comprising:

varying the level of the bottom power while fixing the recording power at a predetermined level;

modulating the power of the laser beam in accordance with the pulse train patterns to record first test signals in the write-once type optical recording medium;

reproducing the first test signals;

determining an optimum level of the bottom power based on the thus reproduced first test signals;

varying the level of the recording power while fixing the bottom power at the optimum level;

modulating the power of the laser beam in accordance with the pulse train patterns to record second test signals in the optical recording medium;

reproducing the second test signals; and determining an optimum level of the recording power based on the thus reproduced second test signals.

2. The method for determining a pulse train pattern in accordance with claim 1, wherein the optimum level of the bottom power is determined based on amplitudes of the reproduced first test signals.

3. The method for determining a pulse train pattern in accordance with claim 2, wherein the optimum level of the bottom power is determined as a level of the bottom power when the amplitude of the reproduced first test signal becomes maximum.

4. The method for determining a pulse train pattern in accordance with claim 1, wherein the optimum level of the recording power is determined based on at least one of jitter and error rates of the reproduced second test signals.

5. The method for determining a pulse train pattern in accordance with claim 1, wherein the optical recording medium comprises a light transmission layer and a first recording layer and second recording layer formed between the substrate and the light transmission layer, and is constituted so that the at least two recording marks are formed by projecting the laser beam thereonto, thereby mixing an element contained in the first recording layer as a primary component and an element contained in the second recording layer as a primary component.

6. The method for determining a pulse train pattern in accordance with claim 1, wherein data are recorded in the optical recording medium by projecting a laser beam having a wavelength equal to or shorter than 450 nm thereonto.

7. The method for determining a pulse train pattern in accordance with claim 1, wherein data are recorded in the optical recording medium by employing an objective lens and a laser beam whose numerical aperture NA and wavelength $\lambda$ satisfy $\lambda/NA \leq 640$ nm, and projecting the laser beam onto the optical recording medium via the objective lens.

8. A method for determining a pulse train pattern including a pulse whose level is set to a level corresponding to a level of a recording power set to be higher than a reproducing power and a pulse whose level is set to a level corresponding to a level of a bottom power set to be higher than the reproducing power and adapted for modulating the power of a laser beam used for recording data in a write-once type optical recording medium, the method comprising:

varying the level of the recording power while fixing the level of the bottom power at a level substantially equal to the level of the reproducing power;

modulating the power of the laser beam in accordance with the pulse train patterns to record first test signals in the write-once type optical recording medium;

reproducing the first test signals;

tentatively determining optimum level of the recording power based on the thus reproduced first test signals;

varying the level of the bottom power while fixing the recording power at the tentatively determined optimum level;

modulating the power of the laser beam in accordance with the pulse train patterns to record second test signals in the write-once type optical recording medium;

reproducing the second test signals; and determining an optimum level of the bottom power based on the thus reproduced second test signals.

9. The method for determining a pulse train pattern in accordance with claim 8, wherein the optimum level of the bottom power is determined based on amplitudes of the reproduced second test signals.

10. The method for determining a pulse train pattern in accordance with claim 9, wherein the optimum level of the bottom power is determined as a level of the bottom power when the amplitude of the reproduced second test signal becomes maximum.

11. The method for determining a pulse train pattern in accordance with claim 8, wherein the optimum level of the recording power is tentatively determined based on at least one of jitter and error rates of the reproduced first test signals.

12. The method for determining a pulse train pattern in accordance with claim 8, wherein the optimum level of the recording power is determined based on at least one of jitter and error rates of the reproduced first test signals.

13. The method for determining a pulse train pattern in accordance with claim 8, wherein the optical recording medium comprises a light transmission layer, and a first recording layer and a second recording layer formed between the substrate and the light transmission layer, and is constituted so that the at least two recording marks are formed by projecting the laser beam thereonto, thereby mixing an element contained in the first recording layer as a primary component and an element contained in the second recording layer as a primary component.

14. The method for determining a pulse train pattern in accordance with claim 8, wherein data are recorded in the optical recording medium by projecting a laser beam having a wavelength equal to or shorter than 450 nm thereonto.

15. The method for determining a pulse train pattern in accordance with claim 8, wherein data are recorded in the optical recording medium by employing an objective lens and a laser beam whose numerical aperture NA and wavelength $\lambda$ satisfy $\lambda/NA \leq 640$ nm, and projecting the laser beam onto the optical recording medium via the objective lens.

16. An apparatus for recording data in a write-once type optical recording medium comprising laser beam power modulation pattern determining means for determining a pulse train pattern and for modulating the power of a laser beam used for recording data in the write-once type optical recording medium, the pulse train including a pulse whose level is set to a level corresponding to a level of a recording power set to be higher than a reproducing power and a pulse whose level is set to a level corresponding to a level of a bottom power set to be higher than the reproducing power, the laser beam power modulation pattern determining means being constituted so as to:

vary the level of the bottom power while fixing the recording power at a predetermined level;

modulate the power of the laser beam in accordance with the pulse train patterns to record first test signals in the write-once type optical recording medium;

reproduce the first test signals;

determine an optimum level of the bottom power based on amplitudes of the thus reproduced first test signals;

vary the level of the recording power while fixing the bottom power at the optimum level;

modulate the power of the laser beam in accordance with the pulse train patterns to record second test signals in the optical recording medium;

reproduce the second test signals; and determine an optimum level of the recording power based on at least one of jitter and error rates of the thus reproduced second test signals.

17. The apparatus for recording data in a write-once type optical recording medium in accordance with claim 16, wherein the optimum level of the bottom power is determined based on amplitudes of the reproduced first test signals.

18. An apparatus for recording data in a write-once type optical recording medium comprising laser beam power modulation pattern determining means for determining a pulse train pattern and for modulating the power of a laser beam used for recording data in the write-once type optical recording medium, the pulse train including a pulse whose level is set to a level corresponding to a level of a recording power set to be higher than a reproducing power and a pulse whose level is set to a level corresponding to a level of a bottom power set to be higher than the reproducing power, the laser beam power modulation pattern determining means being constituted so as to:

varying the level of the recording power while fixing the level of the bottom power at a level substantially equal to the level of the reproducing power;

modulating the power of the laser beam in accordance with the pulse train patterns to record first test signals in the write-once type optical recording medium;

reproducing the first test signals;

tentatively determining the optimum level of the recording power based on the thus reproduced first test signals;

fixing the recording power at the tentatively determined optimum level and varying the level of the bottom power;

modulating the power of the laser beam in accordance with the pulse train patterns to record second test signals in the write-once type optical recording medium;

reproducing the second test signals; and determining the optimum level of the bottom power based on at least one of jitter, amplitude, and error rates of the thus reproduced second test signals.

19. The apparatus for recording data in a write-once type optical recording medium in accordance with claim 18, wherein the optimum level of the bottom power is determined based on amplitudes of the reproduced second test signals.

20. A write-once type optical recording medium comprising a substrate and at least one recording layer disposed on the substrate and being constituted so that data are recorded by projecting a laser beam whose power is modulated in accordance with a pulse train pattern, the pulse train pattern including at least pulses whose levels are set to levels corresponding to a recording power and a bottom power, onto the at least one recording layer to form a recording mark in the at least one recording layer, the write-once type optical recording medium being recorded with modulation pattern setting data for setting a pulse train pattern used for modulating a power of the laser beam, which modulation pattern setting data are produced by:

determining pulse train patterns by varying the level of the bottom power while fixing the recording power at a predetermined level;

modulating the power of the laser beam in accordance with the pulse train patterns to record first test signals in the write-once type optical recording medium;

reproducing the first test signals;

determining an optimum level of the bottom power based on the thus reproduced first test signals;

varying the level of the recording power while fixing the bottom power at the optimum level;

modulating the power of the laser beam in accordance with the pulse train patterns to record second test signals in the optical recording medium;

reproducing the second test signals; and determining an optimum level of the recording power based on the thus reproduced second test signals.

21. The write-once type optical recording medium in accordance with claim 20, wherein the modulation pattern setting data are produced by determining the optimum level of the bottom power as a level of the bottom power when the amplitude of the reproduced first test signal becomes maximum.

22. The write-once type optical recording medium in accordance with claim 20, wherein the modulation pattern setting data are produced by determining the optimum level of the recording power based on at least one of jitter and error rates of the reproduced second test signals.

23. The write-once type optical recording medium in accordance with claim 20, which further comprises a light transmission layer, and a first recording layer and a second recording layer formed between the substrate and the light transmission layer, and is constituted so that recording marks are formed by projecting the laser beam thereonto, thereby mixing an element contained in the first recording layer as a primary component and an element contained in the second recording layer as a primary component.

24. A write-once type optical recording medium comprising a substrate and at least one recording layer disposed on the substrate and being constituted so that data are recorded by projecting a laser beam whose power is modulated in accordance with a pulse train pattern, the pulse train pattern including at least pulses whose levels are set to levels corresponding to a recording power and a bottom power, onto the at least one recording layer to form a recording mark in the at least one recording layer, the write-once type optical recording medium being recorded with modulation pattern setting data for setting a pulse train pattern used for modulating a power of the laser beam, which modulation pattern setting data are produced by:

determining pulse train patterns by varying the level of the recording power while fixing the level of the bottom power at a level substantially equal to the level of the reproducing power, modulating the power of the laser beam in accordance with the pulse train patterns to record first test signals in the write-once type optical recording medium, reproducing the first test signals, tentatively determining the optimum level of the recording power based on the thus reproduced first test signals, varying the level of the bottom power while fixing the recording power at the tentatively determined optimum level, modulating the power of the laser beam in accordance with the pulse train patterns to record second test signals in the write-once type optical recording medium, reproducing the second test signals, and determining the optimum level of the bottom power based on the thus reproduced second test signals.

25. The write-once type optical recording medium in accordance with claim 24, wherein the modulation pattern setting data are produced by determining the optimum level of the bottom power as a level of the bottom power when the amplitude of the reproduced second test signal becomes maximum.

26. The write-once type optical recording medium in accordance with claim 24, wherein the modulation pattern setting data are produced by determining the optimum level of the recording power based on at least one of jitter and error rates of the reproduced first test signals.

27. The write-once type optical recording medium in accordance with claim 24, wherein the modulation pattern setting data are produced by tentatively determining the optimum level of the recording power based on at least one of jitter and error rates of the reproduced first test signals.

28. The write-once type optical recording medium in accordance with claim 24, which further comprises a light transmission layer, and a first recording layer and a second recording layer formed between the substrate and the light transmission layer, and is constituted so that the at least two recording marks are formed by projecting the laser beam thereonto, thereby mixing an element contained in the first recording layer as a primary component and an element contained in the second recording layer as a primary component.

* * * * *